United States Patent
Sakai et al.

(10) Patent No.: US 6,696,138 B2
(45) Date of Patent: Feb. 24, 2004

(54) SOLID ELECTROLYTIC CAPACITOR AND METHOD FOR PRODUCING THE SAME

(75) Inventors: Atsushi Sakai, Nagano (JP); Ryuji Monden, Nagano (JP); Toru Sawaguchi, Nagano (JP); Katsuhiko Yamazaki, Nagano (JP); Yuji Furuta, Nagano (JP); Hideki Ohata, Chiba (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 10/303,728

(22) Filed: Nov. 26, 2002

(65) Prior Publication Data

US 2003/0148023 A1 Aug. 7, 2003

Related U.S. Application Data

(62) Division of application No. 09/576,264, filed on May 24, 2000, now Pat. No. 6,517,892.
(60) Provisional application No. 60/182,191, filed on Feb. 14, 2000, provisional application No. 60/157,074, filed on Oct. 1, 1999, and provisional application No. 60/135,845, filed on May 24, 1999.

(30) Foreign Application Priority Data

Sep. 7, 1999 (JP) ............................................. 11-252371
Dec. 27, 1999 (JP) ............................................. 11-370296

(51) Int. Cl.⁷ .............................. B32B 15/00; H05D 5/12
(52) U.S. Cl. ...................... 428/209; 428/461; 428/469; 428/702; 428/704; 361/523; 361/525; 361/528; 361/529; 29/25.03; 252/510; 427/79; 427/80; 427/81

(58) Field of Search .................................. 428/209, 461, 428/469, 702, 704; 361/523, 525, 528, 529; 29/25.03; 252/510; 427/80, 79, 81

(56) References Cited

U.S. PATENT DOCUMENTS

| 4,803,596 A | 2/1989 | Hellwig et al. |
| 4,910,645 A | 3/1990 | Jonas |
| 4,959,753 A | 9/1990 | Kudoh et al. |
| 5,455,736 A | 10/1995 | Nishiyama et al. |
| 5,455,738 A | 10/1995 | Montesano et al. |

FOREIGN PATENT DOCUMENTS

| DE | 40 29 110 A1 | 4/1991 |
| EP | 340 512 | 11/1989 |
| EP | 820 076 | 1/1998 |
| EP | 844630 | 5/1998 |
| JP | 61-239617 | 10/1986 |
| JP | 61-240625 | 10/1986 |
| JP | 62-118511 | 5/1987 |
| JP | 4-94110 | 3/1992 |
| JP | 5-175082 | 7/1993 |
| JP | 8-53566 | 2/1996 |
| JP | 9-320901 | 12/1997 |
| JP | 10-64761 | 3/1998 |
| JP | 10-149954 | 6/1998 |

*Primary Examiner*—Deborah Jones
*Assistant Examiner*—Ling Xu
(74) *Attorney, Agent, or Firm*—Sughrue Mion, PLLC

(57) ABSTRACT

A solid electrolytic capacitor comprises a porous valve acting metal having formed thereon a dielectric film and a solid electrolyte formed on the dielectric film. The solid electrolyte occupies from 10 to 95% of the space within a pore of the porous metal.

20 Claims, 1 Drawing Sheet

SOLID ELECTROLYTIC CAPACITOR AND METHOD FOR PRODUCING THE SAME

CROSS REFERENCE TO RELATED APPLICATIONS

This application is a divisional of application Ser. No. 09/576,264 filed May 24, 2000, the disclosure of which is incorporated herein by reference, and which claims benefit pursuant to 35 U.S.C. §119(e) (i) of the filing dates of Provisional Application 60/135,845 filed May 24, 1999, Provisional Application 60/157,074 filed Oct. 1, 1999 and Provisional Application 60/182,191, filed Feb. 14, 2000 pursuant to 35 U.S.C. §111(b).

TECHNICAL FIELD

The present invention relates to a solid electrolytic capacitor and a production method thereof. More specifically, the present invention relates to a solution of an oxidizing agent (an oxidizing agent solution) and a solution of a monomer (a monomer solution) necessary for forming a solid electrolyte of the solid electrolytic capacitor. The present invention further relates to a solid electrolytic capacitor or a production method thereof, comprising preferably a solid electrolyte formed of an electrically conducting polymer composition obtained by specifying the viscosity of the oxidizing agent solution or the monomer solution.

The present invention even further relates to a solid electrolytic capacitor and a production method thereof, preferably comprising a solid electrolyte formed of an electroconducting (electrically conducting) polymer composition obtained by specifying the humidity in the polymerization of an oxidizing agent solution and a monomer solution in the solid electrolyte.

The present invention even further relates to a solid electrolytic capacitor, more specifically, a solid electrolytic capacitor in which the solid electrolyte formed on the outer surface of an anode body is an electrically conducting polymer containing a lamellar structure, wherein the solid electrolyte provided on the dielectric film formed on a valve acting metal occupies from 10 to 95% of the space within a pore of the electrode, so that the adhesive property between the solid electrolyte and the dielectric layer formed on a metal oxide film can be improved, high capacitance and low impedance can be realized, the leakage current can be improved, and good moisture resistance load characteristics and excellent heat resistance can be achieved.

The present invention also relates to a solid electrolytic capacitor, more specifically, a solid electrolytic capacitor in which the solid electrolyte formed on the outer surface of an anode body is an electrically conducting polymer containing a lamellar structure, wherein the solid electrolyte provided on the dielectric film formed on a valve acting metal covers 60% or more of the dielectric film, so that the adhesive property between the solid electrolyte and the dielectric layer formed on a metal oxide film can be improved, high capacitance and low impedance can be realized, and good moisture resistance load characteristics and excellent heat resistance can be achieved.

DESCRIPTION OF RELATED ART

A solid electrolytic capacitor is a device where an oxide dielectric film is formed on the surface of an anode substrate comprising a metal foil subjected to etching treatment or the like, a solid semiconductor layer (hereinafter referred to as a "solid electrolyte") is formed as a counter electrode outside the dielectric layer, and an electrically conducting layer such as an electrically conducting paste is further formed thereon. The device is actually used as a product after completely sealing the entire device with epoxy resin or the like and leading out terminals from respective electrodes.

In recent years, with the progress toward digitized electrical equipment or personal computers capable of high speed processing, demands are increasing for a compact capacitor having a large capacitance or a capacitor showing low impedance in the high frequency region. As the compact capacitor having a large capacitance, electrolytic capacitors such as aluminum electrolytic capacitor and tantalum electrolytic capacitor are known. The aluminum electrolytic capacitor can be advantageously produced to have a large capacitance at a low cost but has a problem in that when an ion conducting liquid electrolyte is used as the electrolyte, high impedance results in the high frequency region and the capacitance decreases accompanying the evaporation of electrolytic solution with the elapse of time, and in addition, the temperature characteristics are bad. The tantalum electrolytic capacitor has a problem in that a manganese oxide is generally used as the electrolyte and since this manganese oxide is mainly produced by the thermal decomposition of manganese nitrate, the possibility of damage of the dielectric film at the thermal decomposition cannot be eliminated, and moreover, due to relatively high specific resistance of manganese oxide, the impedance is high in the high frequency region.

For the solid electrolyte, it is already known to use, for example, an inorganic semiconductor material such as manganese dioxide and lead dioxide, a TCNQ complex salt, an intrinsic electrically conducting polymer having an electric conductivity of from $10^{-3}$ to $5 \times 10^3$ S/cm (JP-A-1-169914 (the term "JP-A" as used herein means an "unexamined published Japanese patent application", corresponding to U.S. Pat. No. 4,803,596)) or an electrically conducting polymer such as π-conjugated polyaniline (see, JP-A-61-239617), polypyrrole (see, JP-A-61-240625), polythiophene derivative (see, JP-A-2-15611) or polyisothianaphthene (see, JP-A-62-118511). These electrically conducting polymers comprising a π-conjugated structure are mostly used as a composition containing a dopant. In recent years, not only the addition of a dopant but also a combination use with, for example, manganese dioxide (see, JP-B-6-101418 (the term "JP-B" as used herein means an "examined Japanese patent publication") (corresponding to U.S. Pat. No. 4,959,753)) or filler (see, JP-A-9-320901) is employed.

In the case of using lead dioxide, precautions as to the environment are additionally required.

Capacitors using a TCNQ complex salt solid for the solid electrolyte have good heat fusion workability and excellent electric conductivity but are considered to show poor reliability in heat resistance (soldering heat resistance) at the solder joining because the TCNQ complex salt itself has a problem in heat resistance.

Capacitors using an electrically conducting polymer for the solid electrolyte do not have a dielectric film rupture problem and favored with a high impedance property but disadvantageously are deficient in heat resistance, thermal shock resistance and vibration resistance.

The electrically conducting polymer layer as a solid electrolyte has a high electric conductivity and is formed to cover throughout the inner surfaces of pores inside the cathode. At this time, for satisfying the fundamental characteristics of the capacitor, such as leakage current and heat resistance, the structure formed inside the foil pore and the coverage must be considered.

An example of the electrically conducting polymer formed article of which the structure is controlled is a sponge-like electrically conducting polymer formed article having a continuous phase of an electrically conducting polymer disclosed in JP-A-8-53566. This formed article is produced by a method of cooling a solvent-containing polyaniline or derivative thereof in any molding container to freeze the solvent and then removing the solvent, or a method of cooling a solution containing aniline or an aniline derivative as a monomer and a protonic acid/oxidizing agent to freeze the solvent and polymerizing the solution at a temperature lower than the melting point of the solvent.

In particular, as regarding the solid electrolyte provided on a dielectric film formed on a valve acting metal which is a constituent element of a capacitor, JP-A-7-122464 refers to a structure of an electrically conducting polymer formed within a microfine pore and discloses a tantalum solid electrolytic capacitor comprising a sintered body of tantalum powder, an oxide dielectric film formed on the surface of the sintered body and as a solid electrolyte, an electrically conducting polymer compound covering the oxide dielectric film. The tantalum solid electrolytic capacitor disclosed in this patent publication is constructed such that the electrically conducting polymer compound covers the oxide dielectric film while leaving a cavity in a pore constituting the surface of a sintered body and the electrically conducting polymer compound occupies, in terms of the volume ratio, 70% or less of the volume of the pore.

However, JP-A-8-53566 does not disclose an application example of the sponge-like electrically conducting polymer formed article as to a solid electrolytic capacitor. According to the production method disclosed in this patent publication, the sponge-like electrically conducting polymer formed article is produced by cooling an electrically conducting polymer solution to freeze the solvent, polymerizing the solution and then removing the solvent by freeze-drying or melting it. This method has a problem as to operativity and moreover, the oxide dielectric film is readily damaged on freezing or melting. Therefore, it is difficult to apply this technique to a solid electrolytic capacitor.

In the method disclosed in JP-A-7-122464 of forming a structure such that an electrically conducting polymer compound covers an oxide dielectric film while leaving a cavity in the pore, the ratio of the cavity occupying the pore is controlled by the repetition of oxidation polymerization. Therefore, if an electrically conducting polymer layer is formed to have a large thickness on the outer surface of an anode body after forming the electrically conducting polymer while leaving a cavity in the pore, the cavity already present in the microfine pore is clogged. Thus, an electrically conducting polymer layer cannot be formed to have a predetermined thickness on the outer surface while maintaining the cavity in a microfine pore. Furthermore, the surface of the polymer layer is not uneven, therefore, the adhesion to the electrically conducting paste layer is poor. Moreover, the ratio of the electrically conducting polymer compound as a solid electrolyte is specified only by volume. This patent publication does not refer at all to the covering area which relates to adhesion (which is an important factor governing capacitor properties) between the dielectric film and the electrically conducting polymer as a solid electrolyte.

As such, in regard of a solid electrolytic capacitor where an electrolytic conducting polymer to work out to a solid electrolyte is formed on a dielectric film of a solid electrolytic capacitor electrode foil comprising a valve acting metal having formed thereon an oxide film, no technique has been heretofore known on the optimal ratio in covering the dielectric film with the polymer.

As the oxidizing agent for use in conventional techniques, for example, chemical polymerization of 5-membered heterocyclic compounds such as thiophene, iron(III) chloride, $Fe(ClO_4)_3$, organic acid iron(III) salt, inorganic acid iron (III) salt, alkyl persulfate, ammonium persulfate (hereinafter simply referred to as "APS"), hydrogen peroxide, $K_2Cr_2O_7$, etc., (see, JP-A-2-15611), cupric compounds, silver compounds, etc., (see, JP-A-10-32145) are known.

With respect to the method for forming a solid electrolyte using an electrically conducting polymer, for example, a method of fusing the electrically conducting polymer (solid electrolyte) described above on a dielectric film on the surface of a valve-acting metal having fine void structures to form an electrically conducting polymer layer, and a method of depositing the above-described electrically conducting polymer on a dielectric film are known.

More specifically, in the case of using, for example, a polymer of a 5-membered heterocyclic compound such as pyrrole or thiophene for the solid electrolyte, a method of dipping an anode foil having formed thereon a dielectric film in a lower alcohol and/or water-based solution of a 5-membered heterocyclic compound monomer and after removing it, again dipping the foil in an aqueous solution having dissolved therein an oxidizing agent and an electrolyte to cause chemical polymerization of the monomer, thereby forming an electrically conducting polymer layer (see, JP-A-5-175082), a method of coating simultaneously or sequentially a 3,4-ethylenedioxythiophene monomer and an oxidizing agent each preferably in the form of a solution on the oxide film of a metal foil to form an electrically conducting polymer layer (see, JP-A-2-15611 and JP-A-10-32145), and the like are known.

In order to solve the above-described problems, the electrically conducting polymer such as polypyrrole is formed by electrolytic or chemical polymerization and used for the solid electrolyte of a solid electrolytic capacitor. However, the electrically conducting polymer film obtained fails to have sufficiently high uniformity or when the electrolytic capacitor is fabricated, the soldering heat resistance, the impedance property and the like are not satisfactory.

In recent years, a method of forming an electrically conducting polymer, particularly polypyrrole, is disclosed, where a methanol solution of dodecylbenzenesulfonic acid iron salt used as an oxidizing agent for causing chemical oxidation polymerization is specified to have a viscosity of less than 100 cp by taking account of production efficiency (see, JP-A-4-94110). However, in this technique, thiophene, aniline and derivatives thereof are not described and the oxidizing agent used is a metal salt of an organic acid. Therefore, the viscosity inevitably increases in the process for obtaining a concentration effective in the polymerization.

Also, a method for forming an electrically conducting polymer, particularly polypyrrole, is disclosed, where the viscosity of the oxidizing agent using an aromatic sulfonic acid metal salt is from 100 to 500 cp and thereby the repetition frequency of dipping in an oxidizing agent solution and in a monomer solution is decreased (see, JP-A-10-14954). When the viscosity of the oxidizing agent is reduced to 100 cp or less, the polymerization efficiency of the monomer in turn decreases, as a result, the amount of the electrically conducting polymer formed is disadvantageously small.

Recently, also a method of forming an electroconducting polymer by chemical oxidative polymerization is known, where an isopropyl alcohol mixed solution containing 3,4-ethylenedioxythiophene as a monomer and ferric p-toluenesulfonate as an oxidizing agent is allowed to stand in an air at a temperature of from about 30° C. to about 50° C. and a humidity of about 60% or more for about 30 minutes (see, JP-A-10-64761).

However, because of the formation into a mixed solution of monomer, oxidizing agent and isopropyl alcohol, the monomer and the oxidizing agent are difficult to recover and the yield of products decreases. Furthermore, the mixed solution readily evaporates due to the isopropyl alcohol used. As a result, the polymerization reaction is accelerated and the polymer thus formed at a high rate is duly considered to have very coarse form. For obtaining a polymer form capable of exhibiting sufficiently high electric conductivity, the humidity condition of about 60% or more seems to be necessary as water content in the atmosphere.

DISCLOSURE OF THE INVENTION

An object of the present invention is to provide a solid electrolytic capacitor having excellent properties satisfying the requirements with respect to compact size, reduction in weight, high capacitance, high frequency property, tan δ (tangent of loss angle), leakage current, heat resistance (reflow soldering property), durability and the like.

In particular, an object of the present invention is to provide a heat resistant solid electrolytic capacitor having excellent low impedance property and high durability in a sparking voltage test using an electrically conducting polymer obtained by specifying the viscosity of an oxidizing agent solution and/or a monomer solution.

First, increase in viscosity of an oxidizing agent solution and/or a monomer solution causes a reduction in capacitance.

More specifically, an aluminum foil having formed thereon a dielectric material obtained by etching the surface is dipped with an oxidizing agent solution or a monomer solution and then dried, as a result, a highly viscous oxidizing agent or monomer film is formed on the surface of a porous body, and microfine pore openings present on the surface of the porous body are clogged. The polymer is formed on the surface by contact with a monomer or an oxidizing agent, therefore, the polymer is not formed inside the pores, which causes a reduction in capacitance.

Second, a decrease in the viscosity of an oxidizing agent solution and/or a monomer solution causes reduction in the amount of polymer adhered in a single polymerization step. Therefore, a satisfactory solid electrolyte may not be formed unless the number of polymerization steps is increased. That is, the decrease in viscosity of an oxidizing agent solution and/or a monomer solution abates capability of oxidizing the monomer, lessens the amount of monomer, and reduces the amount of polymer formed.

Under these circumstances, it is necessary to obtain capacitor properties with a small number of polymerization steps to allow an oxidizing agent solution and/or a monomer solution to have a viscosity of a certain level and to increase the capacitance.

An object of the present invention is to provide a method for producing a solid electrolyte capable of achieving appearance of capacitor properties with a reduced dipping frequency in an oxidizing agent solution and in a monomer solution, where the viscosity of an oxidizing agent solution and/or a monomer solution used for forming a solid electrolyte of a solid electrolytic capacitor from an electrically conducting polymer is specified and thereby the monomer oxidation efficiency is increased.

In particular, a further object of the present invention is to provide a solid electrolytic capacitor having small leakage current and excellent tan δ by using an electroconducting polymer obtained by specifying the humidity in the polymerization process.

The mixed solution of a monomer and an oxidizing agent has a problem in the humidity control and yield during the polymerization process.

This is ascribable to the fact that in the case of impregnating a dielectric film obtained by etching the surface of a valve-acting metal with a mixed solution of a monomer and an oxidizing agent and polymerizing it at a low humidity, a highly viscous film is formed on the surface of the porous body due to the presence of a monomer and an oxidizing agent dispersed together. As a result, microfine pore inlets present on the surface of porous body are blocked and the polymer cannot be satisfactorily formed in the inside of pores, which causes reduction in the capacitance. Accordingly, in this embodiment the humidity must be controlled to about 60% or more as a polymerization condition.

Furthermore, the polymerization proceeds on aging due to the presence of a monomer and an oxidizing agent together, as a result, the oligomer ratio increases, the mixed solution itself polymerizes, the monomer and the oxidizing agent cannot be recovered, and the yield decreases.

Even in the case of forming an electroconducting polymer composition film by repeatedly coating a solution containing a monomer of the polymer and a solution containing an oxidizing agent one after another, the humidity in the polymerization process must also be controlled so as to ensure high electric conductivity and high reliability.

This is because if the humidity is excessively high in the polymerization process, the polymerization slowly proceeds and the yield of polymer decreases, whereas if the humidity is excessively low, the adhered water and the monomer evaporate and the yield of polymer decreases.

Accordingly, also an object of the present invention is to provide a method for producing a solid electrolyte capable of achieving appearance of good capacitor properties by specifying the humidity range in the polymerization process for forming a solid electrolyte of a solid electrolytic capacitor using an electroconducting polymer, and thereby increasing the oxidation efficiency of monomer.

In order to attain the above-described objects, extensive investigations have been made on the oxidizing agent solution and/or the monomer solution necessary for the electrically conducting polymer composition forming the solid electrolyte. As a result, it has been found that a compact and high-performance solid electrolytic capacitor having low impedance and high durability in a sparking voltage test can be obtained by a solid electrolytic capacitor comprising counter electrodes with one party electrode being assigned a microfine structure dielectric film comprising a metal oxide on the surface of a valve-acting metal foil, and a solid electrolyte comprising an electrically conducting polymer composition formed on the dielectric film, where the electrically conducting polymer forming the solid electrolyte is formed from an oxidizing agent solution and/or a monomer solution having a viscosity of less than 100 cp. An embodiment of the present invention has been accomplished based on this finding.

It has also been found that a compact and high-performance solid electrolytic capacitor having small leakage current and excellent tan δ can be obtained when in a solid electrolytic capacitor comprising counter electrodes with one part electrode being assigned to a microfine structure dielectric film comprising a metal oxide on the surface of a valve-acting metal foil, and a solid electrolyte comprising an electroconducting polymer composition formed on the dielectric film, the solid electrolyte is an electroconducting polymer produced by the polymerization in a humidity atmosphere of from 10% to less than 60%. Another embodiment of the present invention has been accomplished based on this finding.

As a result of additional investigations to solve the above-described problems, the present inventors have first found that in a solid electrolytic capacitor, more specifically, in a solid electrolytic capacitor where the solid electrolyte on the outer surface of an anode body is an electrically conducting polymer containing a lamellar structure, when the solid electrolyte is provided on the dielectric film formed on a valve acting metal, to occupy from 10 to 95% of the space within a pore of the electrode, the solid electrolytic capacitor obtained has improved adhesion between the solid electrolyte and the dielectric film formed on the valve acting metal and favored with excellent stability of various fundamental properties such as capacitance and dielectric loss (tan δ), and stability of reflow soldering heat resistance and moisture resistance load characteristics.

Furthermore, as a result of extensive investigations to solve the above-described problems, the present inventors have also found that in a solid capacitor, more specifically, in a solid electrolytic capacitor where the solid electrolyte is an electrically conducting polymer containing a lamellar structure, when the solid electrolyte is provided on a dielectric film formed on a valve acting metal, to cover 60% or more of the dielectric film, the solid electrolytic capacitor obtained is favored with excellent stability of various fundamental properties such as capacitance and dielectric loss (tan δ), and stability of reflow soldering heat resistance and moisture resistance load characteristics. A further embodiment of the present invention has been accomplished based on these findings.

More specifically, objects of the present invention has been attained by the following embodiments:

(1) a method for producing a solid electrolytic capacitor, comprising covering a valve-acting metal anode foil having formed on the surface thereof an oxide dielectric film with a repeating sequence of a solution containing a monomer of an electrically conducting polymer and a solution containing an oxidizing agent to form an electrically conducting polymer composition film on the dielectric film, wherein the solution containing a monomer of an electrically conducting polymer and/or the solution containing an oxidizing agent has a viscosity of less than 100 cp;

(2) a solid electrolytic capacitor comprising an oxide dielectric film having thereon an electrically conducting polymer composition layer, which is produced by the method described in (1) above, wherein the electrically conducting polymer in the composition contains as a repeating chemical structure a structural unit represented by the following formula (1a):

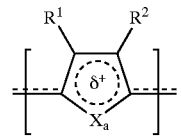

wherein the substituents $R^1$ and $R^2$ each independently represents a monovalent group selected from the group consisting of a hydrogen atom, a linear or branched, saturated or unsaturated hydrocarbon group having from 1 to 6 carbon atoms, a linear or branched, saturated or unsaturated alkoxy group having from 1 to 6 carbon atoms, a hydroxyl group, a halogen atom, a nitro group, a cyano group, a trifluoromethyl group, a phenyl group and a substituted phenyl group; $R^1$ and $R^2$ may be combined with each other at an arbitrary position to form at least one divalent chain for forming at least one 5-, 6- or 7-membered saturated or unsaturated ring structure; $X_a$ represents a hetero atom selected from the group consisting of S, O, Se or Te; the alkyl group and the alkoxy group represented by $R^1$ or $R^2$ each may optionally contain in the chain thereof a carbonyl bond, an ether bond, an ester bond, an amide bond or an imino bond; and δ represents a number of from 0 to 1;

(3) the solid electrolytic capacitor as described in (2) above, wherein the structural unit represented by formula (1a) is a chemical structure represented by the following formula (2):

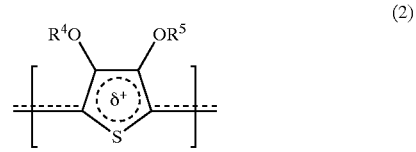

wherein the substituents $R^4$ and $R^5$ each independently represents a hydrogen atom, a linear or branched, saturated or unsaturated hydrocarbon group having from 1 to 6 carbon atoms, or a substituent for forming at least one 5-, 6- or 7-membered saturated or unsaturated ring structure containing the two oxygen elements shown in the formula by combining hydrocarbon groups having from 1 to 6 carbon atoms with each other at an arbitrary position; the ring structure formed as described above includes a chemical structure such as a substituted vinylene group and a substituted o-phenylene group; and δ represents a number of from 0 to 1;

(4) the method for producing a solid electrolytic capacitor as described in (1) above, comprising an oxide dielectric film having provided thereon an electrically conducting polymer composition layer, the method comprising polymerizing a monomer compound on an oxide dielectric film by an oxidizing agent, wherein the monomer compound is a compound represented by the following formula (3a):

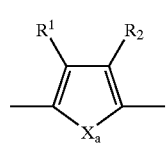

wherein the substituents $R^1$, $R^2$ and $X_a$ are the same as defined in formula (1a) and the polymerization is performed in the presence of a compound capable of providing an anion of an organic sulfonic acid compound or sulfonate anion having a doping ability;

(5) the method for producing a solid electrolytic capacitor as described in (4) above, wherein the monomer compound represented by formula (1a) is a compound represented by the following formula (4):

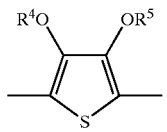

(4)

wherein the substituents $R^4$ and $R^5$ are the same as defined in formula (2);

(6) the method for producing a solid electrolytic capacitor as described in (1), (4) and (5) above, wherein the oxidizing agent is a metal salt solution of an oxidative inorganic acid;

(7) the method for producing a solid electrolytic capacitor as described in (1), (4), (5) and (6) above, wherein the metal salt of an oxidative inorganic acid is a persulfate;

(8) the method for producing a solid electrolytic capacitor as described in (1), (4), (5), (6) and (7) above, wherein the monomer compound is a monomer compound of a polymer having electric conductivity, and thiophene, aniline or derivatives thereof;

(9) the method for producing a solid electrolytic capacitor as described in (1), (4), (5), (6), (7) and (8) above, wherein the thiophene derivative is 3,4-ethylenedioxythiophene;

(10) a method for producing a solid electrolytic capacitor, comprising a polymerization step of coating a solution containing a monomer of an electroconducting polymer and a solution containing an oxidizing agent in repeating sequence on a valve-acting metal anode having formed on the surface thereof an oxide dielectric film, wherein the electroconducting polymer is formed by setting the humidity in the atmosphere of polymerization process to from 10% to less than 60%;

(11) a solid electrolytic capacitor comprising an electroconducting polymer composition layer provided on the oxide dielectric film according to the method of (10) above, wherein the electroconducting polymer in the composition contains a structural unit represented by the following formula (1b) as a repeating chemical structure:

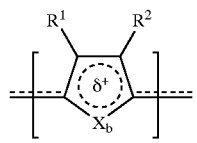

(1b)

wherein the substituents $R^1$ and $R^2$ each independently represents a monovalent group selected from the group consisting of a hydrogen atom, a linear or branched, saturated or unsaturated hydrocarbon group having from 1 to 6 carbon atoms, a linear or branched, saturated or unsaturated alkoxy group having from 1 to 6 carbon atoms, a hydroxyl group, a halogen atom, a nitro group, a cyano group, a linear or branched perfluoroalkyl group having from 1 to 6 carbon atoms, a phenyl group and a substituted phenyl group; the substituents $R^1$ and $R^2$ may be combined with each other at an arbitrary position to form at least one divalent chain for forming at least one 5-, 6- or 7-membered saturated or unsaturated ring structure; Xb represents a hetero atom selected from S, O, Se, Te and $NR^3$; $R^3$ represents a hydrogen atom, a linear or branched, saturated or unsaturated hydrocarbon group having from 1 to 6 carbon atoms, a phenyl group, or a linear or branched, saturated or unsaturated alkoxy group having from 1 to 6 carbon atoms; and the alkyl group and the alkoxy group represented by $R^1$, $R^2$ or $R^3$ each may optionally contain in the chain thereof a carbonyl bond, an ether bond, an ester bond, an amide bond or an imino bond; provided that δ is a number of from 0 to 1;

(12) the solid electrolytic capacitor as described in (11) above, wherein the structural unit represented by formula (1b) is a chemical structure represented by the following formula (2):

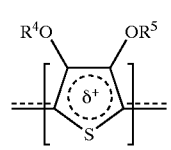

(2)

wherein the substituents $R^4$ and $R^5$ each independently represents a hydrogen atom, a linear or branched, saturated or unsaturated hydrocarbon group having from 1 to 6 carbon atoms or a substituent forming at least one 5-, 6- or 7-membered saturated or unsaturated ring structure containing the two oxygen atoms shown in the formula when the hydrocarbon groups having from 1 to 6 carbon atoms are combined with each other at an arbitrary position, the ring structure formed including a chemical structure such as a substituted vinylene group and a substituted o-phenylene group, and δ represents a number of from 0 to 1;

(13) the method for producing a solid electrolytic capacitor as described in (10) above, the solid electrolytic capacitor comprising an electroconducting polymer composition layer provided on the oxide dielectric film, wherein a monomer is polymerized on the oxide dielectric film by an oxidizing agent, the monomer is a compound represented by the following formula (3b):

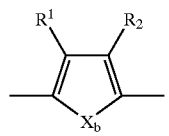

(3b)

wherein the substituents $R^1$, $R^2$ and $X_b$ are the same as defined in formula (1b), and the polymerization is performed in the presence of a compound capable of providing an anion of an organic sulfonic acid or sulfonate anion having a doping ability;

(14) the method for producing a solid electrolytic capacitor as described in (13) above, wherein the monomer represented by formula (1b) is a compound represented by the following formula (4):

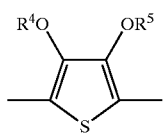

(4)

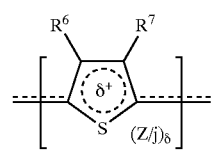

(5)

wherein the substituents $R^4$ and $R^5$ are the same as defined in formula (2);

(15) the method for producing a solid electrolytic capacitor as described in (11) and (14) above, wherein the oxidizing agent is a metal salt or ammonium salt solution of an oxidative inorganic acid;

(16) the method for producing a solid electrolytic capacitor as described in (11), (14) and (15) above, wherein the metal salt or ammonium salt of an oxidative inorganic acid is persulfate;

(17) the method for producing a solid electrolytic capacitor as described in (11), (14), (15) and (16) above, wherein the monomer is a monomer for a polymer having electric conductivity, and pyrrole, thiophene, aniline or a derivative thereof;

(18) the method for producing a solid electrolytic capacitor as described in (11), (14), (15), (16) and (17) above, wherein the thiophene derivative is 3,4-ethylenedioxythiophene;

(19) a solid electrolytic capacitor comprising a porous valve acting metal having formed thereon a dielectric film and a solid electrolyte formed on the dielectric film, wherein the solid electrolyte occupies from 10 to 95% of the space within a pore of the porous metal;

(20) the solid electrolytic capacitor as described in (19) above, wherein the solid electrolyte is an electrically conducting polymer containing a lamellar structure;

(21) a solid electrolytic capacitor comprising a porous valve acting metal having formed thereon a dielectric film and a solid electrolyte formed on the dielectric film, wherein the solid electrolyte covers 60% or more of the dielectric film;

(22) the solid electrolytic capacitor as described in (21) above, wherein the solid electrolyte is an electrically conducting polymer containing a lamellar structure;

(23) the solid electrolytic capacitor as described in (20) or (22) above, wherein at least a portion of an interlayer portion in said lamellar structure comprises a space portion;

(24) the solid electrolytic capacitor as described in any one of (19) to (23) above, wherein the space within a pore, partly occupied by the solid electrolyte, is an independent or communicated bubble void space;

(25) the solid electrolytic capacitor as described in any one of (19) to (24) above, wherein the solid electrolyte is an electrically conducting polymer containing as a repeating unit a divalent group comprising a 5-membered heterocyclic ring-containing compound or a derivative thereof;

(26) the solid electrolytic capacitor as described in (25) above, wherein the electrically conducting polymer containing as a repeating unit a divalent group comprising a 5-membered heterocyclic ring-containing compound or a derivative thereof is an electrically conducting polymer containing as a repeating unit a structure represented by the following formula (5):

wherein the substituents $R^6$ and $R^7$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen atom, a nitro group, a cyano group, a primary, secondary or tertiary amino group, $CF_3$, a phenyl group and a substituted phenyl group, the hydrocarbon chains of $R^6$ and $R^7$ may be combined with each other at an arbitrary position to form at least one divalent chain for forming at least one 3-, 4-, 5-, 6- or 7-membered saturated or unsaturated hydrocarbon cyclic structure together with the carbon atoms substituted by $R^6$ and $R^7$, the cyclic combined chain may optionally contain a bond selected from the group consisting of carbonyl, ether, ester, amide, sulfide, sulfinyl, sulfonyl and imino, $\delta$ is in the range of 0 to 1, Z represents an anion, and j represents the valency of Z and is 1 or 2;

(27) the solid electrolytic capacitor as described in (26) above, wherein the electrically conducting polymer has an electric conductivity of from 0.1 to 200 S/cm;

(28) the solid electrolytic capacitor as described in (19) to (27) above, wherein the valve acting metal is any one of aluminum, tantalum, niobium and titanium;

(29) a method for producing a solid electrolytic capacitor, comprising forming a dielectric film on a porous valve acting metal and forming a solid electrolyte on the dielectric film, wherein the solid electrolyte is formed to occupy from 10 to 95% of the space within a pore of the porous metal;

(30) a method for producing a solid electrolytic capacitor comprising forming a dielectric film on a porous valve acting metal and forming a solid electrolyte on the dielectric film, wherein the solid electrolyte is formed to cover about 60% or more of the dielectric film;

(31) a method for producing a solid electrolytic capacitor, comprising covering a valve-acting metal anode foil having formed on the surface thereof an oxide dielectric film with repeating sequence of a solution containing a monomer of an electrically conducting polymer and a solution containing an oxidizing agent and then polymerizing to form an electrically conducting polymer composition film on the dielectric film, wherein the solution containing a monomer of the electrically conducting polymer and/or the solution containing the oxidizing agent has a viscosity of less than about 100 cp at 23° C.; wherein the electrically conducting polymer composition film is formed by setting the humidity in the atmosphere of the polymerization process to from about 10% to less than about 60%; and wherein the solid electrolyte is formed on the dielectric film to occupy from about 10 to about 95% of the space within a pore of the valve metal;

(32) a method for producing a solid electrolytic capacitor, comprising covering a valve-acting metal anode foil having formed on the surface thereof an oxide dielectric film with repeating sequence of a solution containing a monomer of an electrically conducting polymer and a solution containing an oxidizing agent and then polymerizing to form an electrically conducting polymer composition film on the dielectric film, wherein the solution containing a monomer of the electrically conducting polymer and/or the solution containing the oxidizing agent has a viscosity of less than about 100 cp at 23° C.; wherein the electrically conducting polymer composition film is formed by setting the humidity in the atmosphere of the polymerization process to from about 10% to less than about 60%; and wherein the solid electrolyte is formed on the dielectric film to cover about 60% or more of said dielectric film;

(33) a solid electrolytic capacitor produced by the process of embodiment (31); and

(34) a solid electrolytic capacitor produced by the process of embodiment (32).

DETAILED DESCRIPTION OF THE INVENTION

Figure 1:
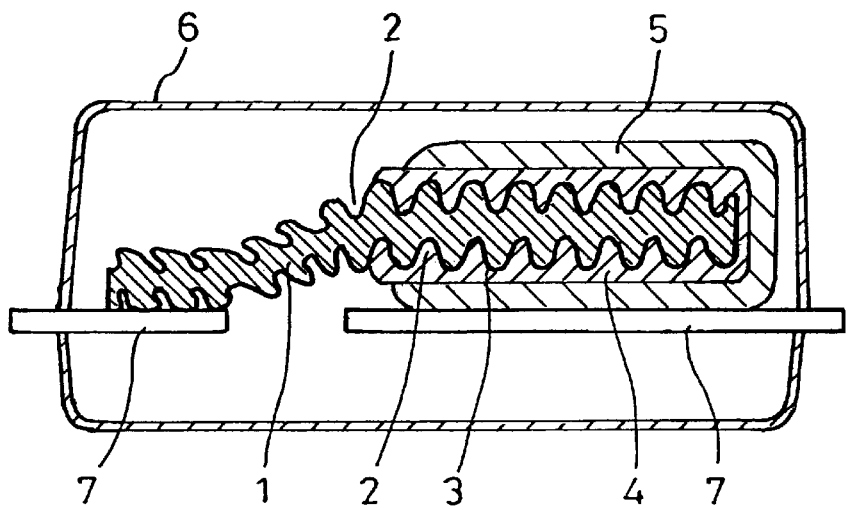
FIG. 1 is a cross-sectional view showing one example of the solid electrolytic capacitor according to the present invention, where 1 is a valve-acting metal electrode, 2 is a pore (micorfine pore), 3 is a dielectric film, 4 is an electrically conducting polymer composition, 5 is an electrically conducting layer, 6 is a jacket, and 7 is a connecting lead.

The present invention is described in detail below.

In an embodiment of the present invention, as described in the foregoing, the viscosity of the oxidizing agent solution and/or the monomer solution in the electrically conducting polymer composition is specified, so that an electrically conducting polymer composition layer (charge-transfer complex) improved in the capacitor property can be advantageously formed, as a result, a high-performance solid electrolytic capacitor having excellent low impedance property and high durability in a sparking voltage test or the like can be provided and also a production method thereof can be provided.

In another embodiment of the present invention, as described in the foregoing, the humidity in the polymerization process of an electroconducting polymer composition from a oxidizing agent solution and a monomer solution is specified, so that an electroconducting polymer composition layer (charge-transfer complex) improved in the capacitor properties can be advantageously formed, as a result, a compact and high-performance solid electrolytic capacitor exhibiting low impedance and excellent tan δ can be provided and also a production method thereof can be provided.

The electrically conducting polymer in the electrically conducting polymer composition suitable for the capacitor of the present invention is a polymer having a π electron-conjugated structure in the polymer main chain. The polymer has a polymerization degree of from 2 to about 1,000, preferably from about 5 to about 500. Specific examples thereof include polyaniline, poly-p-phenylene, poly-p-phenylenevinylene, polythienylenevinylene, 5-membered polyheterocyclic polymers and substituted derivatives thereof. A copolymer obtained by copolymerizing at least two monomers capable of producing the above-described polymers may also be used.

The polyheterocyclic polymers as specific examples are preferably a π electron-conjugated polymer containing a structural unit represented by formula (1), more preferably a π electron-conjugated polymer containing a structural unit represented by formula (2).

In formulae (1), (3) and (5) shown above, useful examples of the linear or branched, saturated or unsaturated hydrocarbon group having from 1 to 6 carbon atoms represented by the substituent $R^1$, $R^2$, $R^3$, $R^6$ and $R^7$ include a methyl group, an ethyl group, a vinyl group, a propyl group, an allyl group, an isopropyl group, a butyl group and a 1-butenyl group. Useful examples of the linear or branched, saturated or unsaturated alkoxy group having from 1 to 6 carbon atoms include a methoxy group, an ethoxy group, a propoxy group, an isopropoxy group and a butoxy group.

Useful examples of the substituent other than the hydrocarbon group and the alkoxy group include a nitro group, a cyano group, a phenyl group and a substituted phenyl group (e.g., a phenyl group substituted by a halogen group such as Cl, Br, F, etc.). The alkyl group or the alkoxy group represented by $R^1$, $R^2$, $R^6$ and $R^7$ each may optionally contain in the chain thereof a carbonyl bond, an ether bond, an ester bond, an amide bond or an imino bond. Particularly useful examples thereof include a methoxyethoxy group and a methoxyethoxyethoxy group.

The substituents $R^1$ and $R^2$ and $R^6$ and $R^7$ may be combined with each other at an arbitrary position to form at least one divalent chain for forming at least one 5-, 6- or 7-membered saturated or unsaturated ring structure. Examples of the substitution in formula (1b) or (3b) include 3,4-propylene-substituted structure (formula (a)), 3,4-butylene-substituted structure (formula (b)), 3,4-butenylene-substituted structure (formula (c)), 3,4-butadienylene-substituted structure (formula (d)) and naphtho[2,3-c]-condensed structure (formula (e)):

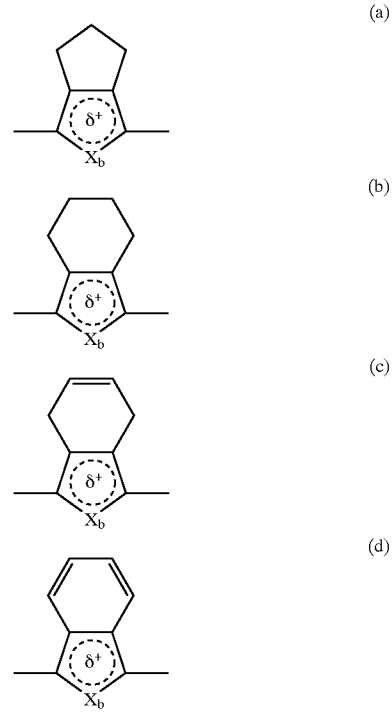

(e)

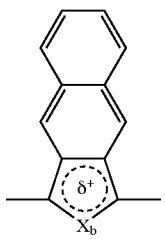

(h)

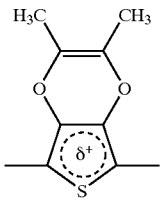

In the formulae above, $X_b$ represents a hetero atom and examples thereof include S, O, Se, Te and $NR^3$. The 3,4-butadienylene-substituted structure (formula (d)) where $X_b$ is S is denoted an isothianaphthenylene structure in the case of the repeating structural unit of formula (1b) or denoted an isothianaphthene in the case of the monomer compound structure of formula (3b). Similarly, the naphtho[2,3-c] condensed structure (formula (e)) is denoted a naphtho[2,3-c]thienylene structure in the case of formula (1b) or denoted a naphtho[2,3-c]thiophene in the case of the monomer compound structure of formula (3b). In the formulae, δ represents a number of charges per the repeating structural unit and is a value of from 0 to 1.

Useful examples of the substituents $R^4$ and $R^5$ in formulae (2) and (4) include a methyl group, an ethyl group, a propyl group, an isopropyl group, a vinyl group and an allyl group. Also, the hydrocarbon groups having from 1 to 6 carbon atoms represented by the substituents $R^4$ and $R^5$ may be combined with each other at an arbitrary position to form at least one 5-, 6- or 7-membered heterocyclic ring structure containing the two oxygen elements shown in formula (2) or (4). Preferred examples thereof include 1,2-ethylene, 1,2-propylene and 1,2-dimethylethylene.

Furthermore, the hydrocarbon groups having from 1 to 6 carbon atoms represented by $R^4$ and $R^5$ may be combined with each other at an arbitrary position to form an unsaturated hydrocarbon ring structure such as a substituted vinylene group and a substituted o-phenylene group. Examples thereof include 1,2-vinylene (formula (f)), 1,2-propenylene (formula (g)), 2,3-butylen-2-ene (formula (h)), 1,2-cyclohexylene (formula (i)), methyl-o-phenylene (formula (j)), 1,2-dimethyl-o-phenylene (formula (k)) and ethyl-o-phenylene (formula (1)):

(f)

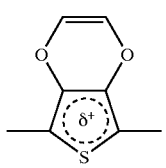

(g)

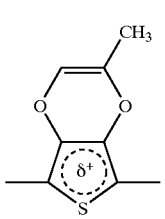

(i)

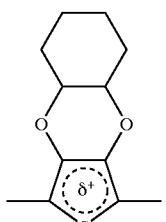

(j)

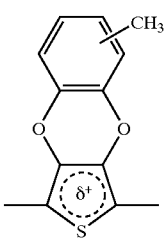

(k)

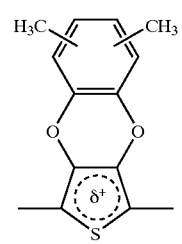

(l)

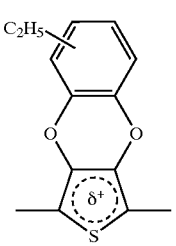

Among the monomer compounds represented by formula (3b) for use in the solid electrolytic capacitor of the present invention and the production method thereof, monomer compounds such as thiophene ($R^1=R^2=H$ and $X_b=S$) or pyrrole ($R^1=R^2=R^3=H$ and $X_b=NR^3$) or among the thiophenes represented by formula (4), 3,4-ethylenedioxy-thiophene, are suitable. Also, many of oxidizing agents which can polymerize such a monomer compound are known.

In the electrically conducting polymer composition of the present invention, the viscosity of the oxidizing agent solution and/or the monomer solution is specified and thereby an electrically conducting polymer capable of ensuring improved capacitor properties can be advantageously formed therefrom. The viscosity (all viscosities herein are at 23° C.) of the oxidizing agent solution and/or the monomer solution is preferably less than 100 cp, preferably 20 cp or less, more preferably from 1 to 10 cp. The capacitor comprising a solid electrolyte formed from the composition is free of the above-described problems and additionally has excellent low impedance property. Such a capacitor has not been heretofore known.

If the viscosity exceeds 100 cp, when an alumina foil having thereon a dielectric material obtained by etching the surface is dipped with an oxidizing agent solution or a monomer solution and then dried, a highly viscous oxidizing agent or monomer film is formed on the surface of a porous body, and the microfine pore openings present on the surface of the porous body are clogged. Furthermore, the polymer is formed on the surface by contact with a monomer or an oxidizing agent, therefore, the polymer is not formed inside the pores, which causes a decrease in capacitance.

When the solution(s) has a viscosity of less than 100 cp, preferably 20 cp or less, more preferably from 1 to 10 cp, the electrically conducting polymer can be filled into the inside of pores present on the surface of the porous body, therefore, a capacitor having high capacitance and excellent low impedance property can be obtained.

In the present invention, a two-solution system using a solution comprising a monomer and a solution comprising an oxidizing agent is employed, so that as compared with the one-solution system using a mixed solution of oxidizing agent and monomer, the monomer and the oxidizing agent can be recovered and the yield can be increased.

In the polymerization process, if the humidity is excessively elevated, the solution state in a low concentration continues long and the polymerization slowly proceeds, therefore, the yield of polymer decreases.

On the other hand, if the humidity is excessively lowered in the polymerization process, the adhered water on the dielectric film evaporates within a short time. As a result, the oxidizing agent is solidified and the monomer is evaporated, whereby the yield of polymer decreases.

Therefore, in one embodiment of the present invention, the humidity in the polymerization process of an electroconducting polymer composition is specified, so that the reaction in the solution state and the reaction in the solid-liquid state can be balanced and an electroconducting polymer increased in the capacitor properties can be advantageously obtained.

The humidity in the atmosphere of the polymerization process is preferably from 10% to less than 60%, more preferably from 20% to 50%. The temperature and the pressure in the atmosphere vary depending on the kind of polymer composition and the polymerization method, and thus cannot be particularly limited, however, a temperature of from −70° C. to 250° C. and a pressure below the atmospheric pressure are generally preferred.

The dopant may be any compound as long as it has a doping ability. For example, an organic sulfonic acid, an inorganic sulfonic acid, an organic carboxylic acid or salts thereof such as a metal salt or an ammonium salt may be used. The method for adding the dopant is not limited and the compound may be added to the oxidizing agent solution and/or the monomer solution, may be allowed to be present together at the time of polymerization or may be added by other methods.

Usually, the method for producing (forming) the above-described solid electrolyte plays an important role in the production of a solid electrolytic capacitor for attaining high capacitance and high frequency property and improving tan δ, leakage current, heat resistance (reflow soldering property), impedance property and durability. For this purpose, important are the π electron-conjugated structure forming the solid electrolyte, the structure of the electrically conducting polymer composition combined with a dopant, and dense filling and formation of the electrically conducting polymer composition layer on a dielectric film so as to increase or improve the homogeneity of the electric conducting path. In particular, the structure of the electrically conducting polymer composition has great effects on the capacitor properties.

In the production method of the present invention, the viscosity of an oxidizing agent solution or, a mixed solution of a dopant and a monomer greatly contributes to formation of a polymer having a π electron-conjugated structure and imparting electric conductivity.

In the production method used in the present invention, the humidity in the polymerization process for forming a polymer having the π electron-conjugated system affects the capacitor properties. Furthermore, the production method is characterized in that the above-described organic sulfonate anion or a combination of the organic sulfonate anion and anion other than that is used as the dopant.

More specifically, in one embodiment a monomer compound represented by formula (3b) or (4) is induced to undergo oxidative polymerization on the dielectric film having pores of an anode substrate by an oxidizing agent solution having a specified viscosity and the polymer composition produced works out to the solid electrolyte on the dielectric material surface. This production process is performed at least once per anode substrate and the process is preferably repeated from 3 to 30 times, whereby a dense solid electrolyte layer can be easily formed.

Further, a monomer represented by formula (3b) or (4) undergoes oxidative polymerization on the dielectric film having microfine pores of an anode substrate by the action of an oxidizing agent and moisture in air in the presence of a compound capable of donating a dopant, and the polymer composition produced works out to the solid electrolyte on the dielectric material surface. This production process is repeated at least once, preferably from 3 to 30 times, per one anode substrate, whereby a highly dense and uniform solid electrolyte layer having high coatability can be easily formed.

In a further embodiment, the dielectric film for use in the present invention is formed by subjecting a porous formed article of a valve acting metal to electrochemical forming or the like. The forming solution for use in the electrochemical forming and the electrochemical forming conditions such as forming voltage cannot be indiscriminately specified but must be experimentally verified in particular by freely varying them according to the capacitance, voltage resistance and the like of the solid electrolytic capacitor produced using the electrode.

In this embodiment, the pore diameter of the electrode for use in the present invention is a factor governing the homogeneous formation of a solid electrolyte layer. The microfine structure, the pore shape and the pore distribution of the porous formed article having formed thereon a dielectric film may be any as long as they can be used for ordinary capacitors. However, in order to more successfully bring out the effects by the coverage of an electrically conducting polymer or its occupancy in a pore according to the present invention, the pores formed on the valve acting metal are preferably specified in the distribution and the specific surface area. For example, the formed article which can be used has a pore diameter of about $2 \times 10^{-7}$ m or less with the volumetric sum of pores per unit mass being about $5 \times 10^{-3}$ $cm^3/g$ or more, preferably a pore size of about $1.2 \times 10^{-7}$ m or less with the volumetric sum of pores per unit mass being about $5 \times 10^{-3}$ $cm^3/g$ or more.

In general, for forming an electrically conducting polymer on a dielectric film, for example, on an oxide dielectric film, means of solution chemical oxidation polymerization, vapor phase chemical oxidation polymerization, electrolytic polymerization or the like is used. However, depending on the intensity of surface tension of the solution, the solid electrolyte layer may be prevented from the formation in the inside of a pore due to the effect of wettability to the oxide film or the like.

For example, in the solution chemical oxidation polymerization, a monomer is polymerized oxidativelly on a dielectric film having microfine pores of an anode substrate by the action of an oxidizing agent in the presence of a compound which can work out to a dopant of the electrically conducting polymer, and the polymer composition produced on the dielectric surface forms a solid electrolyte. By repeating this production step once or more, preferably from 3 to 30 times, per anode substrate, the occupancy (the ratio of the electrically conducting polymer volume occupying the pore volume) may be controlled with good accuracy to from 10 to 95% or the coverage to 60% or more, whereby a desired solid electrolyte layer can be easily formed.

For example, in one preferred embodiment, the polymerization reaction process includes a step of dipping a valve-acting metal anode foil having formed thereon a dielectric film in a solution having a specified viscosity and containing an oxidizing agent (Solution 1), and a step of dipping the foil in a solution having a specified viscosity and containing a monomer compound and a dopant (Solution 2). The valve-acting metal anode foil may be dipped in the order written above, namely, dipping in Solution 1 and then dipping in Solution 2, or in the order reversed thereto, namely, dipping in Solution 2 and then dipping in Solution 1.

In another specific embodiment, the process may include a step of dipping the anode foil in a solution having a specified viscosity and containing an oxidizing agent and a dopant (Solution 3), and a step of dipping the foil in a solution having a specified viscosity and containing a monomer compound (Solution 4). Also in this case, the anode foil may be dipped in the order written above, namely, dipping in Solution 3 and then dipping in Solution 4, or in the order reversed thereto, namely, dipping in Solution 4 and then dipping in Solution 3. Solutions 1 to 4 each may be used in the form of a suspension.

For example, in another preferred embodiment of the production process, the polymerization process may include a step of dipping a valve-acting metal anode foil having formed thereon a dielectric film in a solution containing an oxidizing agent (Solution 1), and a step of dipping the anode foil in a solution containing a monomer and a dopant (Solution 2). The valve-acting metal anode foil may be dipped in the order written above, namely, may be dipped in Solution 1 and then in Solution 2, or in the reverse order, namely, may be dipped in Solution 2 and then in Solution 1.

The dipping process may be replaced by a covering process such as coating, spraying or spreading, which enables the polymerization reaction to proceed on the anode foil.

The solvents in Solutions 1 to 4 may be the same or different. Depending on the kind of solvent, a drying step may be interposed between covering with Solution 1 and covering with Solution 2, or between covering with Solution 3 and covering with Solution 4.

After the solid electrolyte is formed, a step of washing the capacitor device with organic solvents or with water may be used. In this case, it is simple and preferred to use the solvents used in Solutions 1 to 4 as the organic solvents for washing, however, any solvent may be used as long as it can merely dissolve the monomer compounds or the compounds with anions having a doping ability. By using the washing step with the solvent, the content of the dopant in the electrically conducting polymer composition may be reduced. However, in view of the properties of the solid electrolytic capacitor of the present invention, it is necessary to specify the viscosity of the oxidizing agent solution and/or the monomer solution. The specified viscosity contributes to the properties of the solid electrolytic capacitor.

When the thickness of the solid electrolyte layer is increased by repeating the above-described oxidative polymerization treatment, a solid electrolyte having excellent soldering heat resistance (heat stability) may be easily produced. The solid electrolytic capacitor using a solid electrolyte comprising an electrically conducting polymer composition according to the present invention has excellent heat stability and shows good stability of the doped state.

In an embodiment of this invention, the viscosity of the oxidizing agent solution and/or the monomer solution is specified and thereby the oxidation efficiency is improved. As a result, the electrically conducting polymer composition containing dopant anion in combination can be stepwise deposited with good filling on the dielectric material surface and even insides of the pores to form a thin film of the polymer composition. In particular, when a structure of thin film layers being stacked over and over again is formed, the above-described properties can be brought out, so that a capacitor having heat stability highly enough to prevent the polymer from damaging the dielectric film can be provided.

In another embodiment of this invention, the humidity in the polymerization step is specified and thereby the oxidation efficiency of monomer is increased, as a result, the electroconducting polymer composition containing dopant anion in combination can be stepwise deposited with good filling on the dielectric material surface and even insides of the pores to form a thin film of the polymer composition. In particular, when a structure of thin film layers being stacked over and over again is formed, the above-described properties can be brought out and a capacitor having heat stability highly enough to prevent the polymer from damaging the dielectric film can be provided.

As the dopant for use in the present invention, high aromaticity in the heterocyclic skeleton and a sulfonic acid group may be used.

As the compound which provides the above-described anion, alkali metal salts such as the sodium salt and the potassium salt, and quaternary nitrogen-based compound salts such as the ammonium salt of the sulfonic acid compound may also be preferably used.

The oxidizing agent for use in the present invention may be any oxidizing agent if it is suitable for the oxidation polymerization of anilines or thiophenes. Examples of oxidizing agents which can used include oxidizing agents over a wide range, such as iron(III) chloride, $Fe(ClO_4)_3$, organic acid iron(III) salt, inorganic acid iron(III) salt, alkyl persulfate, persulfate, hydrogen peroxide and $K_2Cr_2O_7$ as described in JP-A-2-15611.

Examples of the organic acid in the organic acid iron(III) salt include an alkylsulfonic acid having from 1 to 20 carbon atoms such as methanesulfonic acid and dodecylbenzenesulfonic acid, and an aliphatic carboxylic acid having from 1 to 20 carbon atoms. However, the strict use range of the oxidizing agent may be sometimes limited by the chemical structure of the monomer compound represented by formula (3b), the oxidizing agent, the reaction conditions and the like.

For example, according to the *Handbook of Conducting Polymers*, page 99, FIG. 5, Marcel Dekker, Inc. (1987), the species of the substituent greatly affects the oxidation potential (one index for showing whether the polymerization occurs readily or difficultly) and in turn, governs the oxidation (polymerization) of thiophenes (oxidation potential expands over a wide range of from about 1.8 to about 2.7 V). Accordingly, it is known that the combination of the monomer compound and the oxidizing agent used in practice is important. In the present invention, a combination capable of improving the capacitor properties in the production has been found and thereby the problems have been overcome.

The anion as a dopant may be one which can be derived from a reductant anion after the reaction of the oxidizing agent. Specific examples thereof include chloride ion, $ClO_4^-$, aliphatic organic carboxylate anion having from 1 to 12 carbon atoms, sulfate ion, phosphate anion, aliphatic organophosphate anion having from 1 to 12 carbon atoms and borate anion. Furthermore, an electron acceptor dopant such as $NO^+$ and $NO_2^+$ salts (e.g., $NOBF_4$, $NOPF_6$, $NOSbF_6$, $NOASF_6$, $NOCH_3SO_3$, $NO_2BF_4$, $NO_2PF_6$, $NO_2CF_3SO_3$) may also be used.

In the present invention, an aromatic compound (e.g., sulfoquinone, anthracenemonosulfonic acid, substituted naphthalenemonosulfonic acid) or a heterocyclic sulfonic acid may be used, which differs from conventionally known molecular anions (e.g., $ClO_4^-$, $BF_4^-$) in doping ability (e.g., the stability of charge transfer complex, electric conductivity) and the chemical properties, and exhibits superior effects as compared with the system of using a conventionally known molecular anion (e.g., $ClO_4^-$, $BF_4^-$) alone, in other words, which can bring about particularly excellent effects when a plurality of capacitor devices are manufactured and compared on the capacitor performance.

The sulfoquinone for use in the present invention is a generic term for compounds having one or more sulfonic acid groups and a quinone structure within the molecule. The chemical structure may be any structure if the compound can effectively act as a dopant in the form of sulfonate anion. Examples of sulfoquinone basic skeletons include p-benzoquinone, o-benzoquinone, 1,2-naphthoquinone, 1,4-naphthoquinone, 2,6-naphthoquinone, 9,10-anthraquinone (hereinafter simply referred to as an "anthraquinone"), 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornanedione, 9,10-phenanthrenequinone and 2,7-pyrenequinone.

The sulfonic acid group in the sulfoquinone includes an aromatic sulfonic acid structure resulting from displacing at least one hydrogen of the quinone compound by a sulfonic acid group, and an aliphatic sulfonic acid structure resulting from replacing at least one hydrogen by a sulfoalkylene group through a divalent saturated or unsaturated-hydrocarbon group having from 1 to 12 carbon atoms. Furthermore, a chemical structure resulting from displacing at least one hydrogen of the sulfoquinone by a saturated or unsaturated alkyl group having from 1 to 12, preferably from 1 to 6, carbon atoms, by an alkoxy group having 1 to 12, preferably from 1 to 6, carbon atoms, or by a substituent selected from F, Cl and Br may also be used.

In particular, the sulfoquinone for use in the present invention is preferably a sulfoquinone having an anthraquinone skeleton, a 1,4-naphthoquinone skeleton or a 2,6-naphthoquinone skeleton. Examples thereof include, in the case of anthraquinones, anthraquinone-1-sulfonic acid, anthraquinone-2-sulfonic acid, anthraquinone-1,5-disulfonic acid, anthraquinone-1,4-disulfonic acid, anthraquinone-1,3-disulfonic acid, anthraquinone-1,6-disulfonic acid, anthraquinone-1,7-disulfonic acid, anthraquinone-1,8-disulfonic acid, anthraquinone-2,6-disulfonic acid, anthraquinone-2,3-disulfonic acid, anthraquinone-2,7-disulfonic acid, anthraquinone-1,4,5-trisulfonic acid, anthraquinone-2,3,6,7-tetrasulfonic acid, and the alkali metal salts and ammonium salts thereof.

Examples thereof include, in the case of 1,4-naphthoquinones, 1,4-naphthoquinone-5-sulfonic acid, 1,4-naphthoquinone-6-sulfonic acid, 1,4-naphthoquinone-5,7-disulfonic acid, 1,4-naphthoquinone-5,8-disulfonic acid, the alkali metal salts and ammonium salts thereof.

Examples thereof include, in the case of 2,6-naphthoquinones, 2,6-naphthoquinone-1-sulfonic acid, 2,6-naphthoquinone-3-sulfonic acid, 2,6-naphthoquinone-4-sulfonic acid, 2,6-naphthoquinone-3,7-disulfonic acid, 2,6-naphthoquinone-4,8-disulfonic acid, and the alkali metal salts and ammonium salts thereof.

The sulfoquinone may also be selected from industrial dyes and examples thereof include Anthraquinone Iris R and Anthraquinone Violet RN-3RN. These industrial dyes are a useful sulfoquinone-based dopant and each may be used in the form of the above-described salt.

Some sulfoquinone compounds for use in the present invention participate in the polymerization reaction of the monomer compound and act as an oxidative dehydrogenating agent. As a result, the sulfoquinone is reduced and the resulting proton adduct of the quinone structure, namely, the hydroquinone structure, or quinhydron may be present as it is as a dopant in the solid electrolyte.

The anthracenemonosulfonic acid for use in the present invention is a generic term of anthracenemonosulfonic acid compounds of which the anthracene skeleton is substituted by one sulfonic acid group. Preferred examples of the compound include substituted compounds such that at least one hydrogen of an unsubstituted anthracenesulfonic acid or at least one hydrogen on the anthracene ring of anthracenesulfonic acid is displaced by a linear or branched, saturated or unsaturated hydrocarbon group having from 1 to 12, preferably from 1 to 6, carbon atoms or by a linear or branched, saturated or unsaturated alkoxy group having from 1 to 12, preferably from 1 to 6, carbon atoms.

Specific examples of the compound which provides an unsubstituted anthracenemonosulfonate anion include anthracene-1-sulfonic acid, anthracene-2-sulfonic acid, anthracene-9-sulfonic acid, and alkali metal salts and ammonium salts thereof. Specific examples of the substituent of the substituted anthracenemonosulfonic acid compound where a hydrogen atom on the anthracene ring is further substituted, include an alkyl group such as methyl, ethyl, propyl, isopropyl, butyl, isobutyl, t-butyl, pentyl, hexyl, octyl, decyl and dodecyl; an unsaturated group such as vinyl, allyl, 3-butenyl and 5-hexenyl; and a alkoxy group such as methoxy, ethoxy, propyloxy, butoxy, pentoxy, hexyloxy, octyloxy, decyloxy, dodecyloxy, etc.

Specific examples of compounds which provide the substituted naphthlenemonosulfonate anion include compounds having a compound skeleton such as naphthalene-1-sulfonic acid, naphthalene-2-sulfonic acid, and an alkali metal salt, an ammonium metal salt and an organic quaternary ammonium salt thereof, and also having a chemical structure where at least one hydrogen atom on the naphthalene ring may be displaced by an alkoxy group.

The substituted benzenesulfonic acid for use in the present invention is a generic term for benzenesulfonic acid of which the benzene skeleton is substituted by at least one sulfonic acid group, and alkyl-substituted benzenesulfonic acid. Preferred are the substituted compounds resulting from displacing at least one hydrogen atom of unsubstituted benzenesulfonic acid or at least one hydrogen on the benzene ring of benzenesulfonic acid by a linear or branched, saturated or unsaturated hydrocarbon group having from 1 to 20, preferably from 1 to 12, carbon atoms.

The heterocyclic sulfonate anion which can be used in the present invention is a generic term for heterocyclic sulfonic acid compound anion having a chemical structure where the heterocyclic ring is substituted by at least one sulfonic acid group directly or indirectly through an alkylene group. Examples of preferred skeletons for the heterocyclic compound include substituted skeletons of morpholine, piperidine, piperazine, imidazole, furan, 1,4-dioxane, benzimidazole, benzothiazolylthio, benzoisoxazole, benzotriazole and benzofuran.

Specific examples of compounds which provide the heterocyclic sulfonate anion include 2-imidazolesulfonic acid, 4-morpholinopropanesulfonic acid, furan-3-sulfonic acid, 2-benzimidazolesulfonic acid, 2-benzimidazolepropanesulfonic acid, 4-methyl-1-piperazinomethanesulfonic acid, 2,3-benzofurane-3-sulfonic acid, and their alkali metal salts such as the sodium salt, the ammonium salts and the quaternary ammonium salts.

Although not necessarily limited, an aromatic sulfonic acid compound (e.g., sodium dodecylbenenesulfonate, sodium naphthalenesulfonate, sodium anthraquinone-2-sulfonate, ammonium anthraquinone-2,6-disulfonate, sodium 1,4-naphthoquinone-2-sulfonate, sodium 3-methyl-2-anthraquinolylmethanesulfonate, sodium anthracene-1-sulfonate, sodium anthracene-2-sulfonate, tetrabutylammonium 9,10-dimethoxy-anthracene-2-sulfonate, tetrabutylammonium 9,10-dihexylanthracene-2-sulfonate, sodium 2-propyloxynaphthalene-6-sulfonate, tetrabutylammonium 2-propyloxynaphthalene-6-sulfonate, sodium 2-methoxynaphthalene-6-sulfonate, tetrabutylammonium 2,3-dimethoxynaphthalene-6-sulfonate) or a heterocyclic sulfonic acids (e.g., sodium 4-morpholinopropanesulfonate, sodium 2-benzimidazolpropanesulfonate, sodium 4-methyl-1-piperazinomethanesulfonate, sodium 2,3-benzofurane-3-sulfonate) is preferably used.

In the method for producing a solid electrolytic capacitor of the present invention, the oxidizing agent used to cause chemical polymerization of the thiophene monomer compounds represented by formula (4) is suitably persulfate. Examples of persulfates which can be particularly suitably used for causing chemical polymerization of thiophenes represented by formula (4) include ammonium persulfate and potassium persulfate. Use of iron(III) salt-based oxidizing agent is disadvantageous in view of the capacitor properties because iron (element) inevitably remains in the electrically conducting polymer composition.

Also, persulfates which are suitable for the monomer compound represented by formula (4) is not suitable for thiophene ($R^1=R^2=H$, $X_b=S$) monomer represented by formula (3b). Thus, the persulfate has a limit in that depending on the kind of monomer, use thereof may not be appropriate.

Preferred conditions in the formation (polymerization reaction) of the electrically conducting polymer composition layer are described below.

In the production method of a capacitor according to the present invention, the concentrations of the monomer compound represented by formula (3b) or (4), the oxidizing agent and the sulfonic acid used each varies depending on the kind of the monomer, oxidizing agent or sulfonic acid compound (including the kind of the substituent) or depending on the combination with a solvent or the like. In general, the concentration is from $1 \times 10^{-4}$ to 10 mol/l, preferably from $1 \times 10^{-3}$ to 5 mol/l.

The reaction temperature varies depending on the kind of each reaction composition, the reaction method or the like and cannot be specifically limited, but in general, the reaction temperature is from –70 to 250° C., preferably from –20 to 150° C., more preferably from 0 to 100° C.

Examples of the solvent in the production method of the present invention or for use in washing after the polymerization include ethers such as tetrahydrofuran (THF), dioxane and diethyl ether; ketones such as acetone and methyl ethyl ketone; aprotic polar solvents such as dimethylformamide, acetonitrile, benzonitrile, N-methylpyrrolidone (NMP) and dimethylsulfoxide (DMSO); esters such as ethyl acetate and butyl acetate; non-aromatic chlorine-type solvents such as chloroform and methylene chloride; nitro compounds such as nitromethane, nitroethane and nitrobenzene; alcohols such as methanol, ethanol and propanol; organic acids such as formic acid, acetic acid and propionic acid; acid anhydrides of the organic acid (e.g., acetic anhydride); water and a mixed solvent thereof. Among these, water, alcohols, ketones and/or mixed systems thereof are preferred.

The thus-produced solid electrolyte has an electric conductivity of from 0.1 to 200 S/cm, preferably from 1 to 100 S/cm, more preferably from 10 to 100 S/cm.

For example, when an alcohol such as methanol, ethanol and propanol is used as the solvent for the monomer or oxidizing agent, the rate in taking up the oxidizing agent solution can be controlled by adjusting the humidity in the polymerization atmosphere. In turn, the amount of solid electrolyte formed per once polymerization can be controlled. This reveals that in forming a constant amount of solid electrolyte, the occurrence of polymerization can be increased or reduced by specifying the humidity. Accordingly, the polymer can be produced in the form and amount particularly necessary for obtaining excellent capacitor properties favored with high capacitance and reduced leakage current, by specifying the humidity range in the polymerization atmosphere.

In one embodiment of the invention, the adhesion between the solid electrolyte layer and the dielectric film is a factor governing the important capabilities of a capacitor, such as capacitance, capacitance stability and moisture resistance load characteristics. Along the progress in the formation of microfine pores, bonding points between the electrically conducting polymer and the dielectric film increase and this is a situation advantageous for attaining the above-described capabilities. With respect to the occupancy of the solid electrolyte in the space of a microfine pore at the formation of the solid electrolyte on the electrode surface, if the occupancy is 10% or less, the capacitance stability is deficient and the non-occupied space causes adverse effects on the moisture resistance load characteristics, such as water invasion, or on the mechanical strength characteristics of the capacitor. On the other hand, if the occupancy of the solid electrolyte in the space of a microfine pore exceeds 95%, the capacitance stability and the moisture resistance load characteristics may be attained, however, the ratio of space occupied by the solid electrolyte is too large and this adversely affects the self recoverability using oxygen or the like present within the space. The occupancy is preferably from 20 to 90%, more preferably from 30 to 85%.

The continuous or independent space relatively generated by having a lamellar structure in the solid electrolyte covering the outer surface of an anode body can relieve the influence of thermal stress, mechanical stress and the like imposed during the production process of a capacitor, such as sealing. This structure can cope with various stresses imposed not only during the production process but also from an environment where the capacitor is actually used.

The coverage in covering the dielectric film with the solid electrolyte layer is a factor governing also important capabilities of a capacitor, such as capacitance, capacitance stability and moisture resistance load characteristics. In this embodiment of the present invention, 60% or more of the dielectric film is covered with the solid electrolyte because if the coverage is less than this range, the moisture resistance property may change for the worse due to deterioration of the dielectric film which is exposed at the final stage. Furthermore, in order to obtain a predetermined capacitance, the area must be increased but if the valve acting metal is rendered porous by etching or the like, the metal electrode itself is reduced in the strength, and if a larger electrode is used for obtaining the capacitance, this contradicts the current tendency toward downsizing.

The coverage is preferably 70% or more, more preferably 75% or more.

With respect to the shape of the electrically conducting polymer as a solid electrolyte directly covering the dielectric film, a fibril structure and a lamella structure are preferred. The fibril structure and the lamella structure are a folded structure having overlapping of polymer chains in a broad range and this gives a good effect on the factor of improving the electric conductivity, therefore, the properties such as low impedance which is a tendency nowadays can be improved.

The construction of the solid electrolytic capacitor of the present invention is roughly described below by referring to FIG. 1.

For one part electrode (anode) 1 having on the entire surface thereof pores 2 connected to a connecting lead 7, a known material may be used, for example, a metal foil or bar having a valve action such as aluminum, titanium, tantalum, niobium, or an alloy using such a metal as a substrate, or a sintered slug mainly comprising such a material. The surface of the metal electrode is subjected to etching or electrochemical forming using a conventional method so as to form a dielectric film and increase the specific surface area. Thus, a metal foil having formed thereon a metal oxide film (dielectric film) 3 is used.

The solid electrolyte (electrically conducting polymer composition) 4 is preferably formed by a method of polymerizing a monomer compound on the dielectric film, more preferably by a method of chemically depositing an electrically conducting polymer composition having excellent heat resistance of the present invention on the dielectric layer comprising a dielectric film having a porous or void structure.

On the thus-formed electrically conducting polymer composition layer, another electrically conducting layer is preferably further provided so as to achieve good electrical contact. The electrically conducting layer 5 is formed, for example, by applying electrically conducting paste, plating, metallization or electrically conducting resin film.

The solid electrolytic capacitor thus manufactured by the production method of the present invention is covered with a jacket 6 by resin molding on the electrically conducting layer, by housing in a resin case or a metal-made jacket case or by resin dipping and then, connecting leads 7 are provided thereto. Thereafter, the capacitor can be used as a solid electrolytic capacitor product suitable for various uses.

The viscosity herein was measured according to the method described in JIS K7117-1987 and the viscometer was calibrated according to JIS Z 8809. The use conditions were as follows.

| Apparatus | Model DB Viscometer, manufactured by Toki Sangyo K.K. |
| --- | --- |
| Container used: | Method D |
| Temperature: | 23° C. |
| Humidity: | 40% |

The humidity is a relative humidity measured by a digital thermo-hygrometer (SK-110 TRH TYPE 1, manufactured by Sato K. K.)

BEST MODE FOR CARRYING OUT THE INVENTION

The present invention is described in greater detail below by referring to Examples and Reference Examples. Unless otherwise indicated, all parts, percents, ratios and the like are by weight.

EXAMPLE 1

A formed aluminum foil processed to have a prescribed area was subjected to electrochemical forming at 13V in a 10 wt % aqueous ammonium adipate solution to form a dielectric film on the foil surface. The formed aluminum foil (substrate) was dipped in an aqueous solution (Solution 3, viscosity: 2.5 cp) adjusted to 2 mol/l of ammonium persulfate (hereinafter simply referred to as "APS") and 0.7 wt % of sodium 2-anthraquinonesulfonate (produced by Tokyo Kasei K. K.), and subsequently dipped in 1.2 mol/l of an isopropyl alcohol (hereinafter simply referred to as "IPA") solution (Solution 4, viscosity: 1.8 cp) having dissolved therein 5 g of 3,4-ethylenedioxythiophene.

The resulting substrate was removed and left standing in an environment at 60° C. for 10 minutes, thereby completing the oxidative polymerization, and then the substrate was washed with water. The polymerization reaction treatment and the washing process each was repeated 10 times.

The substrate after the polymerization treatment was compensated with hydrazine in a water/IPA and then carefully extracted and the contents of sulfate ion and sodium 2-anthraquinonesulfonate ion in the electrically conducting polymer composition were determined by an ion chromatography method. As a result, the sulfate ion content was 1.5 mol % and the 2-anthraquinonesulfonate ion content was 14.0 mol %, per all repeating structural units of the polymer in the electrically conducting polymer composition. The increase in the weight of the substrate due to attachment was 15% of the weight of the substrate without any addition. The solid electrolyte layer had an electric conductivity of 73 S/cm.

Thereafter, the aluminum foil substrate having deposited thereon poly-3,4-ethylenedioxythiophene composition was treated in an aqueous 10 wt % ammonium adipate solution and then examined on the sparking voltage. The test was performed by increasing the number of devices for the comparison purpose of the device properties (the same in the following Examples). Namely, the test was performed n=5 times in an environment of 50° C. under the condition of a current density being 10 mA/cm². The results obtained are shown in Table 1 below.

Subsequently, the aluminum core part of the substrate was welded with a plus side lead for collecting the current from the anode and also, connected to a minus side lead through carbon paste and silver paste for collecting the current from the cathode. These elements were finally sealed with epoxy resin to manufacture a capacitor device. The thus-manufactured capacitor device was aged at 125° C. for 2 hours and then subjected to measurement of initial properties. The results obtained are shown together in Table 2 below.

In Table 1, C in the column of initial properties indicates a capacitance and DF indicates a tangent of the loss angle (DF=tan δ×100%). These were each measured at 120 Hz. Z (impedance) is shown by the value at a resonance frequency. LC (leakage current) was measured one minute after application of a rated voltage. The measured values each is an average of 30 samples. With respect to LC, those having an LC of 1 μA or more were determined as defective and those having an LC of 10 μA or more were determined as shorted products. The average LC is calculated exclusive of the defective units.

EXAMPLE 2

A capacitor device was obtained through the same processing as in Example 1 except that the dopant was changed to an aqueous solution (viscosity: 2.7 cp) adjusted to 0.07 wt % of sodium 4-morpholinopropanesulfonate (produced by Tokyo Kasei K. K.) in Example 1. and then evaluated in the same manner as in Example 1. The results obtained are shown in Tables 1 and 2 below.

The contents of sulfate ion and 4-morpholinopropanesulfonate ion in the polymer composition were determined by the method described in Example 1. As a result, the sulfonate ion content was 1.2 mol % and the 4-morpholinopropanesulfonate ion content was 13.0 mol %. The solid electrolyte layer had an electric conductivity of 70 S/cm.

EXAMPLE 3

The surface of a dielectric material prepared by the method described in Example 1 was dipped in an aqueous solution (Solution 1) adjusted to 20 wt % of APS, and then dipped in an IPA/water mixed solution (Solution 2, viscosity: 1.9 cp) obtained by adding tetrabutylammonium 4-morpholinopropanesulfonate (hereinafter simply referred to as "MOPSTB") to 1.2 mol/l of IPA solution having dissolved therein 5 g of 3,4-ethylenedioxythiophene and adjusted to have a MOPSTB concentration of 0.1 wt %. At this time, the MOPSTB salt used was obtained from sodium 4-morpholinopropanesulfonate (produced by Tokyo Kasei K. K.) by mixing and reacting therewith tetrabutylammonium bromide to recrystallize the salt. The resulting substrate was removed and left standing in an environment at 60° C. for 10 minutes, thereby completing the oxidative polymerization, and then the substrate was washed with water. The polymerization reaction treatment and the washing process were both repeated 10 times. The capacitor device obtained was measured and evaluated in the same manner as in Example 1. The results are shown in Tables 1 and 2 below.

The contents of sulfate ion and 4-morpholinopropanesulfonate ion in the polymer composition were determined by the same method as in Example 1. As a result, the sulfonate ion content was 1.6 mol % and the 4-morpholinopropanesulfonate ion content was 8.1 mol %. The solid electrolyte layer had an electric conductivity of 56 S/cm.

EXAMPLE 4

An aluminum foil having formed thereon a dielectric material prepared in the same manner as in Example 1 was dipped in 1.2 mol/l of an IPA solution (Solution 4) having dissolved therein 5 g of 3,4-ethylenedioxythiophene, and then dipped in an IPA/water mixed solution (Solution 3, viscosity: 2.1 cp) having an APS concentration of 20 wt % and adjusted to have a sodium 2-anthraquinonesulfonate concentration of 0.06 mol/l. The resulting substrate was removed and left standing in an environment at 60° C. for 10 minutes, thereby completing the oxidative polymerization, and then the substrate was washed with water.

The polymerization reaction treatment and the washing process were both repeated 10 times. The capacitor device obtained was evaluated in the same manner as in Example 1. The results are shown in Tables 1 and 2 below.

The contents of sulfate ion and 2-anthraquinone-sulfonate ion in the polymer composition were determined by the method described in Example 1. As a result, the sulfonate ion content was 2.0 mol % and the 2-anthraquinonesulfonate ion content was 0.6 mol %. The solid electrolyte layer had an electric conductivity of 80 S/cm.

Comparative Example 1

A capacitor device was obtained in the same manner as in Example 2 except that thiophene and a butanol solution of a p-toluenesulfonate iron salt having a viscosity of 200 cp were used in place of the 3,4-ethylenedioxythiophene and APS, respectively, in Example 1, and then evaluated in the same manner as in Example 1. The results obtained are shown in Tables 1 and 2 below. The solid electrolyte layer had an electric conductivity of 5 S/cm.

The content of p-toluenesulfonate ion in the polymer composition was determined by the method described in Example 1 and found to be 2.5 mol %. However, 8 mol % of iron ion was present and the sulfate ion content was in excess of 10 mol %, therefore, the percent defective of capacitors was high.

In the sparking voltage test of Examples 1 to 4, the voltage was scarcely reduced and the sparking voltage at the completion of reaction was 19V or more in any Example. However, in Comparative Example 1 using p-toluenesulfonate iron salt, the sparking voltage greatly decreased due to iron ion remaining in a large amount of 8 mol % and since decrease in the sparking voltage occurred before the completion of prescribed reaction, insufficient filling of the solid electrolyte disadvantageously resulted.

TABLE 1

| | Sparking Voltage (unit: V, n = 5) | | | | | | | |
|---|---|---|---|---|---|---|---|---|
| | Number of Reaction Times | | | | | | | |
| | 1 | 2 | 3 | 4 | 5 | 6 | 8 | 10 |
| Example 1 | 19 | 19 | 19 | 19 | 19 | 19 | 19 | 19 |
| Example 2 | 19 | 19 | 19 | 19 | 19 | 19 | 19 | 19 |

TABLE 1-continued

Sparking Voltage (unit: V, n = 5)

Number of Reaction Times

|  | 1 | 2 | 3 | 4 | 5 | 6 | 8 | 10 |
|---|---|---|---|---|---|---|---|---|
| Example 3 | 19 | 19 | 19 | 19 | 19 | 19 | 19 | 19 |
| Example 4 | 19 | 19 | 19 | 19 | 19 | 19 | 19 | 19 |
| Comparative Example 1 | 18 | 14 | 10 | 3 |  |  |  |  |

TABLE 2

Initial Properties

| | C µF | DF % | Z mΩ | LC µA | Number of Defective/Number of Sample, units/units | Short Circuit |
|---|---|---|---|---|---|---|
| Example 1 | 8.0 | 0.6 | 60 | 0.02 | 0/30 | 0 |
| Example 2 | 8.2 | 0.7 | 60 | 0.02 | 0/30 | 0 |
| Example 3 | 7.9 | 0.8 | 60 | 0.03 | 0/30 | 0 |
| Example 4 | 7.8 | 0.8 | 60 | 0.03 | 0/30 | 0 |
| Comparative Example 1 | 5.8 | 3.2 | 90 | 0.44 | 27/30 | 19 |

EXAMPLE 5

A formed aluminum foil processed to have a prescribed area was subjected to electrochemical formation at 13V in a 10 wt % aqueous ammonium adipate solution to form a dielectric film on the foil surface. The formed aluminum foil (substrate) was dipped in 1.2 mol/l of an isopropyl alcohol (hereinafter simply referred to as "IPA") solution having dissolved therein 5 g of 3,4-ethylenedioxythiophene, and subsequently dipped in an aqueous solution adjusted to contain 2 mol/l of ammonium persulfate (hereinafter simply referred to as "APS") and 0.07 mol/l of sodium 2-anthraquinonesulfonate (produced by Tokyo Kasei K. K.).

This substrate was removed and left standing in an environment at 40° C. and a humidity of 40% for 10 minutes, thereby completing the oxidative polymerization. This polymerization reaction treatment process was repeated 25 times and then the substrate was washed with water. The solid electrolyte layer formed had an electric conductivity of 80 S/cm.

On the thus-obtained capacitor device having deposited thereon poly-3,4-ethylenedioxythiophene composition, commonly known carbon paste and silver paste were coated in this order. Four sheets of the devices obtained were stacked, mounted on a lead frame and welded to a cathode lead. Subsequently, the aluminum core part of substrate was welded to an anode side lead for collecting the current from the anode. These elements as a whole were finally sealed with epoxy resin to produce a capacitor. The thus-manufactured capacitor was aged at 125° C. for 2 hours while applying thereto a rated voltage and then the initial properties were measured. The results obtained are shown together in Table 3 below.

In Table 3, C in the column of initial properties indicates capacitance and DF indicates tangent of loss angle (DF=tan δ×100%). These were each measured at 120 Hz. LC (leakage current) and short circuit was tested by applying a rated voltage (13 V) and measurement after one minute. The measured values each is an average of 50 samples. With respect to LC, those having an LC of 1 µA or more were determined as defective and those having an LC of 10 µA or more were determined as short circuit products. The average LC is calculated exclusive of the short circuit products, if any.

EXAMPLE 6

A capacitor device was obtained through the same treatment as in Example 5 except that the humidity in the polymerization process in Example 5 was changed to 10%, and then evaluated in the same manner as in Example 5. The solid electrolyte layer had an electric conductivity of 70 S/cm. The results are shown in Table 3 below.

EXAMPLE 7

A capacitor device was obtained through the same treatment as in Example 5 except that the humidity in the polymerization process in Example 5 was changed to 60%, and then evaluated in the same manner as in Example 5. The solid electrolyte layer had an electric conductivity of 40 S/cm. The results are shown in Table 3 below.

EXAMPLE 8

A formed aluminum foil having formed thereon a dielectric material was prepared in the same manner as in Example 5 and dipped in an aqueous solution adjusted to contain 2 mol/l of ammonium persulfate (hereinafter simply referred to as "APS") and 0.07 mol/l of sodium 2-anthraquinonesulfonate (produced by Tokyo Kasei K. K.) and then in 1.2 mol/l of an isopropyl alcohol (hereinafter simply referred to as "IPA") solution having dissolved therein 5 g of 3,4-ethylenedioxythiophene.

The substrate was removed and left standing in an environment at 40° C. in an atmosphere at humidity of 40% for 10 minutes, thereby completing the oxidative polymerization. This polymerization treatment process was repeated 20 times, the substrate obtained was washed with water and then dried. The thus-obtained capacitor device was evaluated in the same manner as in Example 5. The solid electrolyte layer had an electric conductivity of 70 S/cm. The results are shown in Table 3 below.

EXAMPLE 9

A formed aluminum foil having formed thereon a dielectric material was prepared in the same manner as in Example 5. The surface of this dielectric material was dipped in 1.2 mol/l of an IPA solution having dissolved therein 5 g of pyrrole and then in an aqueous solution adjusted to contain 2 mol/l of APS and 0.07 mol/l of sodium 2-anthraquinonesulfonate.

The substrate was removed and left standing in an environment at 5° C. in an atmosphere at humidity of 40% for 10 minutes, thereby completing the oxidative polymerization. After repeating each dipping process 20 times, the substrate was washed with water and dried. The thus-obtained capacitor device was evaluated in the same manner as in Example 5. The solid electrolyte layer had an electric conductivity of 65 S/cm. The results are shown in Table 3 below.

Comparative Example 2

A capacitor device was obtained in the same manner as in Example 5 except that the polymerization humidity in Example 5 was changed to 65%, and then evaluated in the same manner as in Example 5. The solid electrolyte layer had an electric conductivity of 18 S/cm. The results are shown in Table 3.

Comparative Example 3

A capacitor device was obtained in the same manner as in Example 5 except that the polymerization humidity in Example 5 was changed to 5%, and then evaluated in the same manner as in Example 5. The solid electrolyte layer had an electric conductivity of 15 S/cm. The results are shown in Table 3 below.

TABLE 3

| | Initial Properties | | | | |
|---|---|---|---|---|---|
| | C ($\mu$F) 120 Hz | DF (%) 120 Hz | LC ($\mu$A) | Number of Defective/ Number of Sample (units/units) | Number of Short Circuit (units) |
| Example 5 | 50 | 0.6 | 0.2 | 0/50 | 0 |
| Example 6 | 50 | 0.8 | 0.8 | 4/50 | 0 |
| Example 7 | 50 | 0.7 | 0.4 | 1/50 | 0 |
| Example 8 | 50 | 0.6 | 0.2 | 0/50 | 0 |
| Example 9 | 50 | 0.6 | 0.2 | 0/50 | 0 |
| Comparative Example 2 | 48 | 1.2 | 5.0 | 22/50 | 15 |
| Comparative Example 3 | 48 | 1.0 | 4.0 | 19/50 | 12 |

EXAMPLE 10

An etched aluminum foil having a specified capacitance of 119 $\mu$F/Cm$^2$ was cut into a size of 3 mm×10 mm and a polyimide solution was coated in a width of 1 mm on both surfaces to make a round and thereby divide the surface into a 4-mm portion and a 5-mm portion in the long axis direction, and then dried to form a masking. A 3 mm×4 mm portion of this formed aluminum foil was electrochemically formed with an aqueous 10 wt % ammonium adipate solution by applying a voltage of 13 V and thereby an oxide dielectric film was formed on the cut end parts. The pore distribution of this formed foil (preheated at 200° C. for 2 hours) was measured using an automatic specific area measuring apparatus (JEMINI 2375, manufactured by Shimadzu-Micromellitics) and a sample degassing apparatus (Vacprep 061, manufactured by the same company). As a result, the pore volume per unit mass was 1.83 cm$^3$/g. Thereafter, this 3 mm×4 mm portion of the aluminum foil was dipped in 1.2 mol/l of an isopropyl alcohol (hereinafter simply referred to as "IPA") having dissolved therein 3,4-ethylenedioxy-thiophene (produced by Bayer AG) and then in 2 mol/l of an aqueous ammonium persulfate solution having suspended therein sodium 2-anthraquinonesulfonate in a concentration of 0.07% by weight. Subsequently, this aluminum foil was left standing in an atmosphere at about 40° C. for about 10 minutes to allow the oxidation polymerization to proceed. After a desired electrically conducting polymer is formed in the inside of micropores of the etched aluminum foil, the pore volume per unit mass was again measured in the same manner as above and found to be 1.04 cm$^3$/g. From these values, the occupancy as a ratio of the electrically conducting polymer occupying the space of a microfine pore was calculated according to the following formula (II):

$$\text{Pore Occupancy} = \frac{\text{pore volume before formation of electrically conducting polymer} - \text{pore volume after formation of electrically conducting polymer}}{\text{pore volume before formation of electrically conducting polymer}} \times 100(\%) \quad \text{(II)}$$

and found to be 43%. By repeating this sequence of dipping and polymerization 25 times, a solid electrolyte layer comprising the electrically conducting polymer was formed on the outer surface of the etched aluminum foil. The finally produced poly(3,4-ethylenedioxyethiophene) was washed in warm water at 50° C. and then dried at 100° C. for 30 minutes to form the solid electrolyte layer. At this time, the pore volume was again measured and found to be 0.64 cm$^3$/g and the occupancy in pore was 65%. The error of the occupancy was found to be at most 5% by separately observing the cross section.

Then, carbon paste and silver paste were applied to the aluminum foil in the portion where the electrically conducting polymer composition layer was formed. Four sheets of the thus-prepared aluminum foils were stacked and a cathode lead was connected thereto. To the portion where the electrically conducting polymer was not formed, an anode lead was connected by welding. The resulting device was sealed with an epoxy resin and aged at 125° C. for 2 hours by applying thereto a rating voltage. In this manner, 30 capacitors were completed.

The capacitance and the loss factor (DF=tan δ×100%) at 120 Hz as initial properties, the impedance at a resonance frequency, and the leakage current of these capacitors were measured. The leakage current was measured one minute after the application of rated voltage. In Table 4 below, respective averages of these measured values, the defective ratio on the criterion that the device having a leakage current of 0.592 $\mu$A (0.002 CV) or more is a defective unit, and the number of short-circuited products are shown. The average of the leakage current is the value calculated exclusive of the defective units. The coverage was determined from the specified capacitance of the etched aluminum foil and the capacitance after the formation of the solid electrolyte, according to the following formula (III):

$$\text{Coverage} = \frac{\text{capacitance after formation of solid electrolyte}}{\text{specified capacitance of etched aluminum foil in the product}} \times 100(\%) \quad \text{(III)}$$

$$= \frac{51.9}{0.3 \times 0.4 \times 4 \times 119} \times 100(\%)$$

and found to be 91%.

In Table 5, the results in the reflow soldering test and the subsequent moisture resistance test are shown. In the moisture resistance test, the device having a leakage current of 11.8 $\mu$A (0.04 CV) was evaluated as a defective unit. The reflow soldering test was performed by passing the device through a temperature zone of 230° C. for 30 seconds and the moisture resistance test was performed by allowing the device to stand under high-temperature and high-humidity conditions of 85° C. and 85% RH for 240 hours.

EXAMPLE 11

Thirty capacitors were fabricated in the same manner as in Example 10 except for using ferric sulfate in place of ammonium persulfate and using dihydroiso-thianaphthene in place of 3,4-ethylenedioxythiophene in Example 10. The properties of these capacitor devices were evaluated in the same manner as in Example 10. The results obtained are shown in Tables 4 and 5 below.

EXAMPLE 12

Thirty capacitors were fabricated in the same manner as in Example 10 except for using pyrrole in place of 3,4-ethylenedioxythiophene in Example 10. The properties of these capacitor devices were evaluated in the same manner as in Example 10. The results obtained are shown in Tables 4 and 5 below.

EXAMPLE 13

Thirty capacitors were fabricated in the same manner as in Example 10 except for using furan in place of 3,4-ethylenedioxythiophene in Example 10. The properties of these capacitor devices were evaluated in the same manner as in Example 10. The results obtained are shown in Tables 4 and 5 below.

EXAMPLE 14

Thirty capacitors were fabricated in the same manner as in Example 10 except for using aniline in place of 3,4-ethylenedioxythiophene in Example 10. The properties of capacitor devices were evaluated in the same manner as in Example 10. The results obtained are shown in Tables 4 and 5 below.

Comparative Example 4

Thirty capacitors were fabricated in the same manner as in Example 10 except for forming the solid electrolyte such that the electrically conducting polymer occupied 8% of the space in a microfine pore in Example 10. The properties of these capacitor devices were evaluated in the same manner as in Example 10. The results obtained are shown in Tables 4 and 5 below.

Comparative Example 5

Thirty capacitors were fabricated in the same manner as in Example 10 except for forming the solid electrolyte such that the electrically conducting polymer occupied 97% of the space in a microfine pore in Example 10. The properties of these capacitor devices were evaluated in the same manner as in Example 10. The results obtained are shown in Tables 4 and 5 below.

Comparative Example 6

Thirty capacitors were fabricated in the same manner as in Example 10 except for forming the solid electrolyte by repeating the polymerization 5 times to have a coverage of 55% on the dielectric film in Example 10. The properties of these capacitor devices were evaluated in the same manner as in Example 10. The results obtained are shown in Tables 4 and 5 below.

TABLE 4

| | Initial Properties | | | | | |
|---|---|---|---|---|---|---|
| | Capacitance $\mu F$ | Loss Factor % | Impedance $m\Omega$ | Leakage Current $\mu A$ | Defective Ratio | Number of Short-Circuited Products |
| Example 10 | 51.9 | 6.03 | 0.008 | 0.03 | 0/30 | 0 |
| Example 11 | 50.3 | 6.35 | 0.013 | 0.05 | 0/30 | 0 |
| Example 12 | 50.9 | 6.24 | 0.012 | 0.06 | 0/30 | 0 |
| Example 13 | 49.8 | 6.53 | 0.017 | 0.07 | 0/30 | 0 |
| Example 14 | 49.6 | 6.78 | 0.019 | 0.09 | 0/30 | 0 |
| Comparative Example 4 | 26.7 | 6.58 | 0.031 | 0.89 | 4/30 | 3 |
| Comparative Example 5 | 51.7 | 9.45 | 0.017 | 0.21 | 1/30 | 0 |
| Comparative Example 6 | 36.5 | 7.56 | 0.034 | 0.96 | 2/30 | 1 |

TABLE 5

| | Reflow Soldering Test | | Moisture Resistance Test | | |
|---|---|---|---|---|---|
| | Defective Ratio | Number of Short-circuited Products | Leakage Current | Defective Ratio | Number of Short-Circuited Products |
| Example 10 | 0/30 | 0 | 0.49 | 0/30 | 0 |
| Example 11 | 0/30 | 0 | 0.54 | 0/30 | 0 |
| Example 12 | 0/30 | 0 | 0.59 | 0/30 | 0 |
| Example 13 | 0/30 | 0 | 0.57 | 0/30 | 0 |
| Example 14 | 0/30 | 0 | 0.61 | 0/30 | 0 |
| Comparative Example 4 | 2/27 | 1 | 4.59 | 1/25 | 1 |
| Comparative Example 5 | 1/29 | 1 | 3.49 | 4/28 | 2 |
| Comparative Example 6 | 2/28 | 1 | 3.56 | 3/26 | 2 |

Industrial Applicability

As described in the foregoing, the solid electrolytic capacitor of the present invention comprises a solid electrolyte formed of an electrically conducting polymer polymerized from an electrically conducting polymer composition improved in capacitor property as a result of specifying the viscosity of an oxidizing agent solution and/or a monomer solution, so that a compact, low-impedance and high-performance solid electrolytic capacitor and a production method thereof can be provided.

Furthermore, the solid electrolytic capacitor of the present invention comprises a solid electrolyte formed using a specific 5-membered polyheterocyclic compound as a $\pi$ electron-conjugated polymer in the above-described method, so that effects are provided such that the voltage withstanding property (a sparking voltage test), high frequency property, tan $\delta$, impedance property, leakage current, heat resistance (reflow soldering property) and the like are greatly improved.

In particular, in one embodiment by specifying the viscosity of a solution containing a monomer of the above-described electrically conducting polymer composition and/or an oxidizing agent solution to less than 100 cp, a solid electrolytic capacitor having capacitor properties of a higher degree can be provided.

In particular, in another embodiment the electroconducting polymer layer comprising a monomer or a derivative thereof as a repeating unit and also containing an anionic dopant is polymerized employing a system using two solutions of a solution comprising an oxidizing agent and a solution comprising a monomer by setting the humidity in the atmosphere of polymerization process to from 10% to less than 60%, whereby the monomer and the oxidizing agent can be recovered and a solid electrolytic capacitor having capacitor properties of higher degree can be provided in a high yield.

According to another embodiment, in a solid electrolytic capacitor comprising an anode body having provided on the outer surface thereof a solid electrolyte formed of an electrically conducting polymer containing a lamellar structure, the solid electrolyte is provided on a dielectric film formed on a valve acting metal, to occupy from 10 to 95% of the space in pores of the electrode, whereby the solid electrolytic capacitor obtained can have improved adhesion of the solid electrolyte formed on the metal oxide film and a capacitor favored with various basic properties such as capacitance and dielectric loss (tan δ) and also with excellent stability of reflow soldering heat resistance and moisture resistance load characteristics can be provided.

Furthermore, according to the present invention, a valve acting metal having formed thereon an oxide film is used as the anode body for a solid electrolytic capacitor and a solid electrolyte layer comprising an electrically conducting polymer is formed thereon to cover the dielectric film in a predetermined ratio (60%) or more, whereby a solid electrolytic capacitor device favored with various basic properties such as capacitance and dielectric loss (tan δ) and also with excellent stability of reflow soldering heat resistance and moisture resistance load characteristics can be provided.

While the invention has been described in detail and with respect to specific embodiments, it will be apparent to one skilled in the art that various changes and modifications can be made therein without departing from the spirit and scope thereof.

What is claimed is:

1. A solid electrolytic capacitor comprising a porous valve acting metal foil having formed thereon a dielectric film, and a pore diameter of about $2\times10^{-7}$ m or less with a volumetric sum of pores per unit mass being about $5\times10^{-3}$ cm$^3$/g or more, and a solid electrolyte formed on the dielectric film, wherein the solid electrolyte occupies from 10 to 95% of the space within a pore of said porous metal.

2. The solid electrolytic capacitor as claimed in claim 1, wherein the solid electrolyte is an electrically conducting polymer containing a lamellar structure.

3. A solid electrolytic capacitor comprising a porous valve acting metal foil having formed thereon a dielectric film, and a pore diameter of about $2\times10^{-7}$ m or less with a volumetric sum of pores per unit mass being about $5\times10^{-3}$ cm$^3$/g or more, and a solid electrolyte formed on the dielectric film, wherein the solid electrolyte covers 60% or more of said dielectric film.

4. The solid electrolytic capacitor as claimed in claim 3, wherein the solid electrolyte is an electrically conducting polymer containing a lamellar structure.

5. The solid electrolytic capacitor as claimed in claim 2 or 4, wherein at least a portion of an interlayer portion in said lamellar structure comprises a space portion.

6. The solid electrolytic capacitor as claimed in claim 3, wherein the space within a pore, partly occupied by said solid electrolyte, is a closed cavity or a connected cavity.

7. The solid electrolytic capacitor as claimed in claim 3, wherein said solid electrolyte is an electrically conducting polymer containing as a repeating unit a divalent group comprising a 5-membered heterocyclic ring-containing compound or a derivative thereof.

8. The solid electrolytic capacitor as claimed in claim 3, wherein the valve acting metal foil is any one of aluminum, tantalum, niobium, and titanium.

9. The solid electrolytic capacitor as claimed in claim 4, wherein at least a portion of an interlayer portion in said lamellar structure comprises a space portion.

10. The solid electrolytic capacitor as claimed in claim 1, wherein the space within a pore, partly occupied by said solid electrolyte, is a closed cavity or a connected cavity.

11. The solid electrolytic capacitor as claimed in claim 1, wherein said solid electrolyte is an electrically conducting polymer containing as a repeating unit a divalent group comprising a 5-membered heterocyclic ring-containing compound or a derivative thereof.

12. The solid electrolytic capacitor as claimed in claim 11, wherein said electrically conducting polymer containing as a repeating unit a divalent group comprising a 5-membered heterocyclic ring-containing compound or a derivative thereof is an electrically conducting polymer containing as a repeating unit a structure represented by the following formula (I):

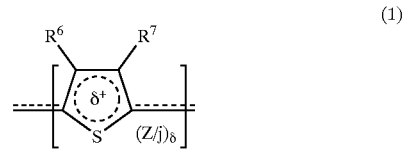

wherein the substituents $R^6$ and $R^7$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen atom, a nitro group, a cyano group, a primary, secondary or tertiary amino group, $CF_3$, a phenyl group and a substituted phenyl group, the hydrocarbon chains of $R^6$ and $R^7$ may be combined with each other at an arbitrary position to form at least one divalent chain for forming at least one 3-, 4-, 5-, 6- or 7-membered saturated or unsaturated hydrocarbon cyclic structure together with the carbon atoms substituted by $R^6$ and $R^7$, said cyclic combined chain may optionally contain a bond selected from the group consisting of carbonyl, ether, ester, amide, sulfide, sulfinyl, sulfonyl and imino, δ is in the range of 0 to 1, Z represents an anion, and j represents a valency of Z and is 1 or 2.

13. The solid electrolytic capacitor as claimed in claim 12, wherein said electrically conducting polymer has an electric conductivity of from 0.1 to 200 S/cm.

14. The solid electrolytic capacitor as claimed in claim 1, wherein the valve acting metal foil is any one of aluminum, tantalum, niobium and titanium.

15. A method for producing a solid electrolytic capacitor, comprising forming a dielectric film on a porous valve acting metal foil, and a pore diameter of about $2\times10^{-7}$ m or less with a volumetric sum of pores per unit mass being about $5\times10^{-3}$ cm$^3$/g or more, and forming a solid electrolyte on the dielectric film, wherein the solid electrolyte is formed to occupy from 10 to 95% of the space within a pore of said porous metal.

16. A method for producing a solid electrolytic capacitor comprising forming a dielectric film on a porous valve acting metal foil, and a pore diameter of about $2\times10^{-7}$ m or less with a volumetric sum of pores per unit mass being about $5\times10^{-3}$ cm$^3$/g or more, and forming a solid electrolyte in the dielectric film, wherein the solid electrolyte is formed to cover about 60% or more of the dielectric film.

17. A method for producing a solid electrolytic capacitor, comprising covering a valve-acting metal anode foil having formed on the surface thereof an oxide dielectric film, and a pore diameter of about $2 \times 10^{-7}$ m or less with a volumetric sum of pores per unit mass being about $5 \times 10^{-3}$ cm$^3$/g or more, with repeating sequence of a solution containing a monomer of an electrically conducting polymer and a solution containing an oxidizing agent and then polymerizing to form an electrically conducting polymer on the dielectric film, wherein the solution containing a monomer of the electrically conducting polymer and/or the solution containing the oxidizing agent has a viscosity of less than about 100 cp at 23° C.; wherein the electrically conducting polymer composition film is formed by setting the humidity in the atmosphere of polymerization process to from about 10% to less than about 60%; and wherein the solid electrolyte is formed on the dielectric film to occupy from about 10 to about 95% of the space within a pore of the valve metal.

18. A method for producing a solid electrolytic capacitor, comprising covering a valve-acting metal anode foil having formed on the surface thereof an oxide dielectric film, and a pore diameter of about $2 \times 10^{-7}$ m or less with a volumetric sum of pores per unit mass being about $5 \times 10^{-3}$ cm$^3$/g or more, with repeating sequence of a solution containing a monomer of an electrically conducting polymer and a solution containing an oxidizing agent and then polymerizing to form an electrically conducting polymer composition film on the dielectric film, wherein the solution containing a monomer of the electrically conducting polymer and/or the solution containing the oxidizing agent has a viscosity of less than about 100 cp at 23° C.; wherein the electrically conducting polymer composition film is formed by setting the humidity in the atmosphere of polymerization process to from about 10% to less than about 60%; and wherein the solid electrolyte is formed on the dielectric film to cover about 60% or more of said dielectric film.

19. A solid electrolytic capacitor produced by a process comprising covering a valve-acting metal anode foil having formed on the surface thereof an oxide dielectric film, and a pore diameter of about $2 \times 10^{-7}$ m or less with a volumetric sum of pores per unit mass being about $5 \times 10^{-3}$ cm$^3$/g or more, with repeating sequence of a solution containing a monomer of an electrically conducting polymer and a solution containing an oxidizing agent and then polymerizing to form an electrically conducting polymer on the dielectric film, wherein the solution containing a monomer of the electrically conducting polymer and/or the solution containing the oxidizing agent has a viscosity of less than about 100 cp at 23° C.; wherein the electrically conducting polymer composition film is formed by setting the humidity in the atmosphere of polymerization process to from about 10% to less than about 60%; and wherein the solid electrolyte is formed on the dielectric film to occupy from about 10 to about 95% of the space within a pore of the valve metal.

20. A solid electrolytic capacitor produced by a process comprising covering a valve-acting metal anode foil having formed on the surface thereof an oxide dielectric film, and a pore diameter of about $2 \times 10^{-7}$ m or less with a volumetric sum of pores per unit mass being about $5 \times 10^{-3}$ cm$^3$/g or more, with repeating sequence of a solution containing a monomer of an electrically conducting polymer and a solution containing an oxidizing agent and then polymerizing to form an electrically conducting polymer composition film on the dielectric film, wherein the solution containing a monomer of the electrically conducting polymer and/or the solution containing the oxidizing agent has a viscosity of less than about 100 cp at 23° C.; wherein the electrically conducting polymer composition film is formed by setting the humidity in the atmosphere of polymerization process to from about 10% to less than about 60%; and wherein the solid electrolyte is formed on the dielectric film to cover about 60% or more of said dielectric film.

* * * * *